United States Patent [19]
Honkasalo et al.

[11] Patent Number: 6,064,663
[45] Date of Patent: *May 16, 2000

[54] CELLULAR CDMA DATA LINK UTILIZING MULTIPLEXED CHANNELS FOR DATA RATE INCREASE

[75] Inventors: Zhi-Chun Honkasalo, Bedford, Tex.; John Noneman, Valley Center, Calif.; Jussi Kahtava, Irving, Tex.; Mika Laukkanen, Oulu, Finland; Rodolfo Vadillo, Camberley, United Kingdom; Ari T. Hottinen, Espoo, Finland

[73] Assignee: Nokia Mobile Phones Limited

[*] Notice: This patent issued on a continued prosecution application filed under 37 CFR 1.53(d), and is subject to the twenty year patent term provisions of 35 U.S.C. 154(a)(2).

[21] Appl. No.: 08/711,487
[22] Filed: Sep. 10, 1996
[51] Int. Cl.[7] ...................................................... H04J 13/00
[52] U.S. Cl. .......................................... 370/335; 370/478
[58] Field of Search ..................................... 370/320, 335, 370/342, 441, 209, 266, 267, 208; 375/269, 200, 261, 340; 455/33.1, 54.1; 330/342, 499

[56] References Cited

U.S. PATENT DOCUMENTS

| | | | |
|---|---|---|---|
| 5,235,614 | 8/1993 | Bruckert et al. | 375/200 |
| 5,396,653 | 3/1995 | Kivari et al. | 455/88 |
| 5,414,728 | 5/1995 | Zehavi | 375/200 |
| 5,430,740 | 7/1995 | Kivari et al. | 371/37 |
| 5,442,625 | 8/1995 | Gitlin et al. | 370/342 |
| 5,577,024 | 11/1996 | Malkamaki et al. | 370/18 |
| 5,583,851 | 12/1996 | Kato et al. | 370/342 |
| 5,606,548 | 2/1997 | Varyrynen | 370/252 |
| 5,706,275 | 1/1998 | Zhengdi | 370/342 |
| 5,737,326 | 4/1998 | I et al. | 370/342 |
| 5,781,542 | 7/1998 | Tanaka et al. | 370/342 |
| 5,781,583 | 7/1998 | Bruckert et al. | 370/342 |

*Primary Examiner*—Huy D. Vu
*Assistant Examiner*—Chiho Andrew Lee
*Attorney, Agent, or Firm*—Brian T. Rivers

[57] ABSTRACT

A method and apparatus for varying the data transmission rate of a code division multiple access (CDMA) telecommunications system. The method and apparatus may be implemented into an existing system operating according to a standard designed for a base data transmission while utilizing the Walsh modulator length, the data transmission frame structure, the channel encoding scheme, or the I/Q modulation level of the existing system. Serial data is input to a transmitter/modulator at a data rate which is higher than the base data transmission rate. The serial data is received over a time period having a duration equal to the duration of the transmission frame and demultiplexed into a plurality of sets of input data. Each of the plurality of sets of input data is then processed in one of a plurality of subchannels using the system channel encoding and interleaving scheme to generate a plurality of sets of processed data. A output serial data stream is then generated by multiplexing the plurality of sets of processed data from the subchannels together. The serial output stream is generated so that the originally received serial data included in the serial output data stream, is generated at the first data rate. The serial output data stream is spread to generate at least one spread data stream and is then transmitted on the channel during a second time period having a duration equal to the duration of the transmission frame, so that the serial data included in the at least one spread data stream is transmitted at the first data rate.

22 Claims, 15 Drawing Sheets

CELLULAR CDMA DATA LINK UTILIZING MULTIPLEXED CHANNELS FOR DATA RATE INCREASE

FIELD OF THE INVENTION

This invention relates to spread spectrum communications systems and, more particularly, to an apparatus and method for providing a variable rate data uplink, utilizing multiplexed channels for data rate increase, in a code division multiple access (CDMA) cellular telecommunications system.

BACKGROUND OF THE INVENTION

Advances in the field of telecommunications have resulted in a variety of types of telecommunications systems being available for use by the general public. Among these telecommunications systems, cellular telephone systems are presently one of the most rapidly developing in terms of technologies and services offered. Cellular systems are currently in widespread use worldwide, with continued growth in sales and subscribers predicted for the future.

Several types of technologies have become dominant in the cellular industry. In the United States most cellular systems currently operating use analog signal transmission techniques, as specified by the Telecommunications Industry Association/Electronic Industry Association (TIA/EIA) AMPS standard, or a combination of analog and time division multiple access (TDMA) signal transmission techniques, as specified by the TIA/EIA IS-54 and IS-136 standards. In Europe, cellular systems may operate according to one of several analog system standards, depending on the country, or according to the digital Global Services for Mobile (GSM) TDMA standard that has been specified for Europe. In other parts of the world most cellular systems operate according to one of the standards used in the United States or Europe, except for in Japan where the TDMA personal digital communication (PDC) standard has been developed and is in use. However, in spite of the present dominance of analog and TDMA technologies, the cellular industry is dynamic and new technologies are constantly being developed as alternatives to these currently dominant technologies. One alternative digital signal transmission technique that has recently been the focus of interest for cellular systems is known as code division multiple access (CDMA). In a CDMA system multiple users, each using a channel identified by a uniquely assigned digital code, communicate with the system while sharing the same wideband frequency spectrum.

CDMA provides several advantages over conventional analog or TDMA systems. Frequency spectrum allocation planning for mobile stations and the base stations of cells within a CDMA system is not necessary, as in analog and TDMA systems, because all CDMA base stations share the entire downlink frequency spectrum, and all mobiles share the entire uplink frequency spectrum. The fact that the wideband frequency spectrum is shared by all uplink or downlink users in CDMA also increases capacity since the number of users that can be multiplexed simultaneously is limited by the number of digital codes available to identify the unique communications channels of the system, not by the number of radio frequency channels available. Additionally, since the energy of the transmitted signals are spread over the wide band uplink or downlink frequency band, selective frequency fading does not affect the whole CDMA signal. Path diversity is also provided in a CDMA system. If multiple propagation paths exist, they can be separated as long as the differences in path delays exceed $1/BW$, where BW equals the bandwidth of the transmission link. An example of a widely accepted cellular system CDMA standard is the TIA/EIA IS-95-A system standard.

Because data transmission applications other than conventional voice traffic transmission are becoming increasingly important in the cellular system area, a system operator who operates a CDMA system may desire to provide services other than phone voice service. Examples of these other services include portable computer cellular modem service or video service. Often, these other services may require that data be transmitted at a rate much faster than that required for voice transmission.

In the case where it is desired to provide a range of different services in a CDMA cellular system, a method and apparatus for varying the data transmission rate in the system, where the data rate could vary within a range required for all system services, would be useful. It would be desirable that this apparatus provide both slower speed data transmission for efficient and reliable speech service and high speed data transmission for other applications. For example, the IS-95-A system is limited to a maximum data rate of 9600 bits per second (9.6 kbps) and it may be desirable to provide services in the IS-95-A system that require data transmission at rates greater than 9.6 kbps. Additionally, because of the large costs involved in developing new systems, it would also be desirable if this apparatus could be operated within an existing system on a noninterfering basis with slower speed transmitters and receivers, and could be implemented with minimum modifications to the air interface of the existing system.

SUMMARY OF THE INVENTION

The present invention provides a method and apparatus for varying the data transmission rate in a code division multiple access(CDMA) telecommunications system. The method and apparatus provides an advantage in that it may be implemented in an existing system to increase the data transmission rate with minimum modification to the air interface of the existing system. The method and apparatus may be implemented into the existing system designed for slower speed data transmission while utilizing the Walsh modulator length, the data transmission frame, the channel encoding scheme, or the I/Q modulation level of the existing system. New devices operating according to the principles of the invention may be introduced into the existing system and operate at increased data rates using the same Walsh modulator length, the same channel coding scheme, and the same I/Q modulation level as existing devices.

In an embodiment of the invention, the method and apparatus is implemented in a system operating according to a standard having a base data transmission rate, a set transmission frame duration on a channel, and a predetermined Walsh modulator length, channel encoding and interleaving scheme and I/Q modulation level. Serial data is input to a transmitter/modulator at a data rate which is higher than the base data transmission rate. The serial data is received over at least one time period having a duration equal to the duration of the transmission frame and demultiplexed into a plurality of sets of input data. The number of sets of input data into which the serial data is demultiplexed may be determined based on a predetermined algorithm. The predetermined algorithm may be configured so that the data in each of the plurality of sets of output data is generated at the base data rate over the first time period.

Each of the plurality of sets of input data is then processed in one of a plurality of subchannels using the system channel encoding and interleaving scheme to generate a plurality of sets of processed data. The processing is done substantially simultaneously, as the sets of input data are received at each subchannel. A output serial data stream is then generated by multiplexing the plurality of sets of processed data from the subchannels together.

The serial output stream is generated so that the originally received serial data included in the serial output data stream is generated at the first data rate. The serial output data stream is then spread to generate at least one spread data stream and transmitted on the channel during a second time period having a duration equal to the duration of the transmission frame, so that the serial data included in the at least one spread data stream is transmitted at the first data rate. The at least one serial output data stream may be generated by multiplexing the processed data into a plurality of adjacent data groups, with each of the data groups divided into a plurality of data portions, and a select data portion of each of the data groups containing data from one of the plurality of sets of processed data, so that when the data is spread and transmitted on the channel, each group period of the frame includes data from each of the sets of processed data.

In another embodiment of the invention the I/Q modulation level may be increased to realize greater increases in the data transmission rate. In this embodiment, two output serial data streams are generated when multiplexing together the plurality of sets of processed data from the subchannels. The serial data is included in these two output serial data streams. These two output serial data streams are then spread to generate two separate spread data streams, and one spread data stream is transmitted on a quadrature (Q) component of the channel, and the other spread data stream is transmitted on an in-phase (I) component of the channel.

BRIEF DESCRIPTION OF THE DRAWINGS

A more complete understanding of the method and apparatus of the present invention may be had by reference to the following detailed description when read in conjunction with the accompanying drawings wherein.

DETAILED DESCRIPTION OF THE INVENTION

Figure 1A:
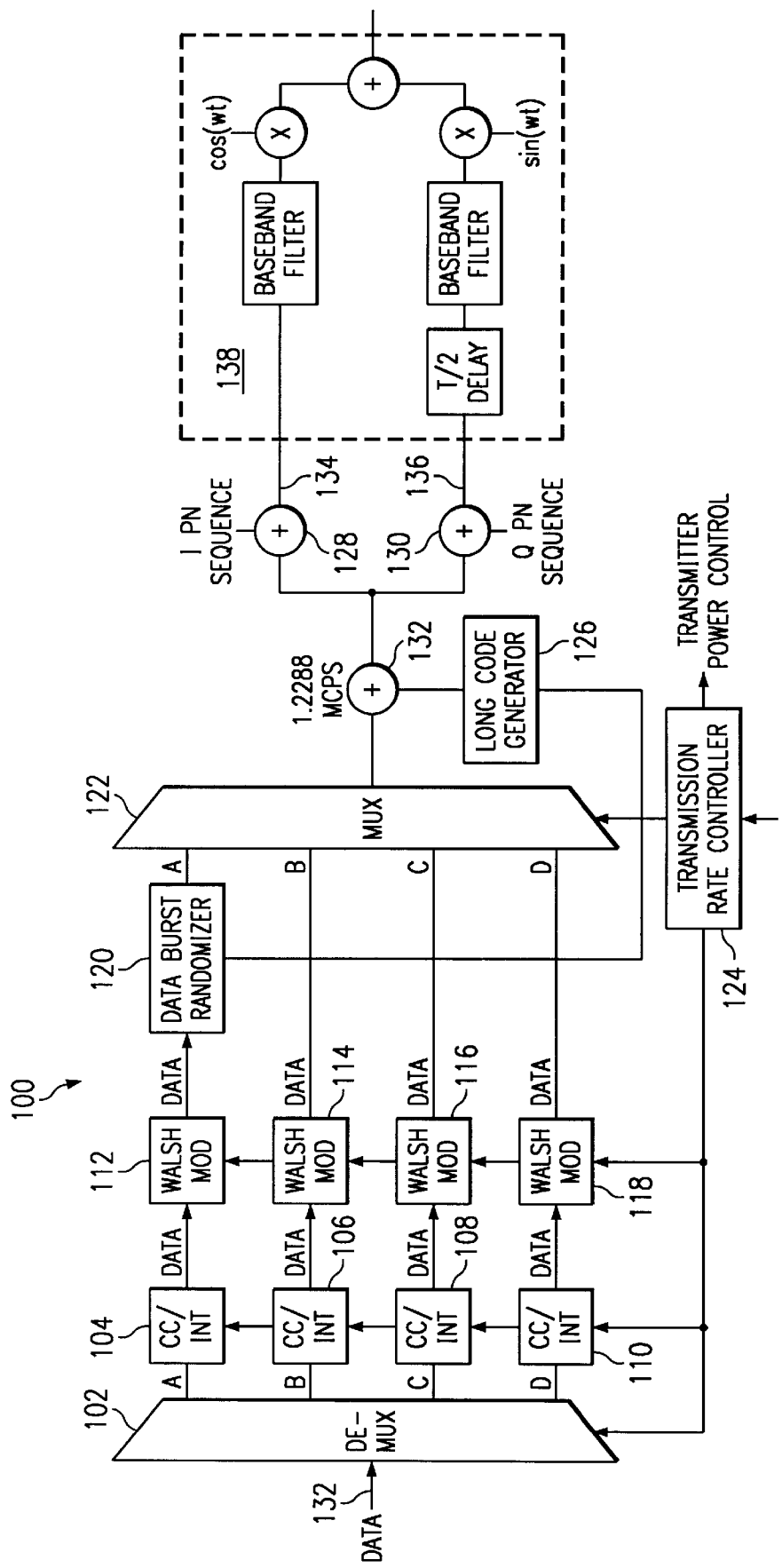
FIGS. 1A and 1B are schematic block diagrams showing portions of a transmitter modulator, and receiver demodulator, respectively, utilizing multiplexed subchannels according to an embodiment of the present invention.
Figures 1B, 1C:
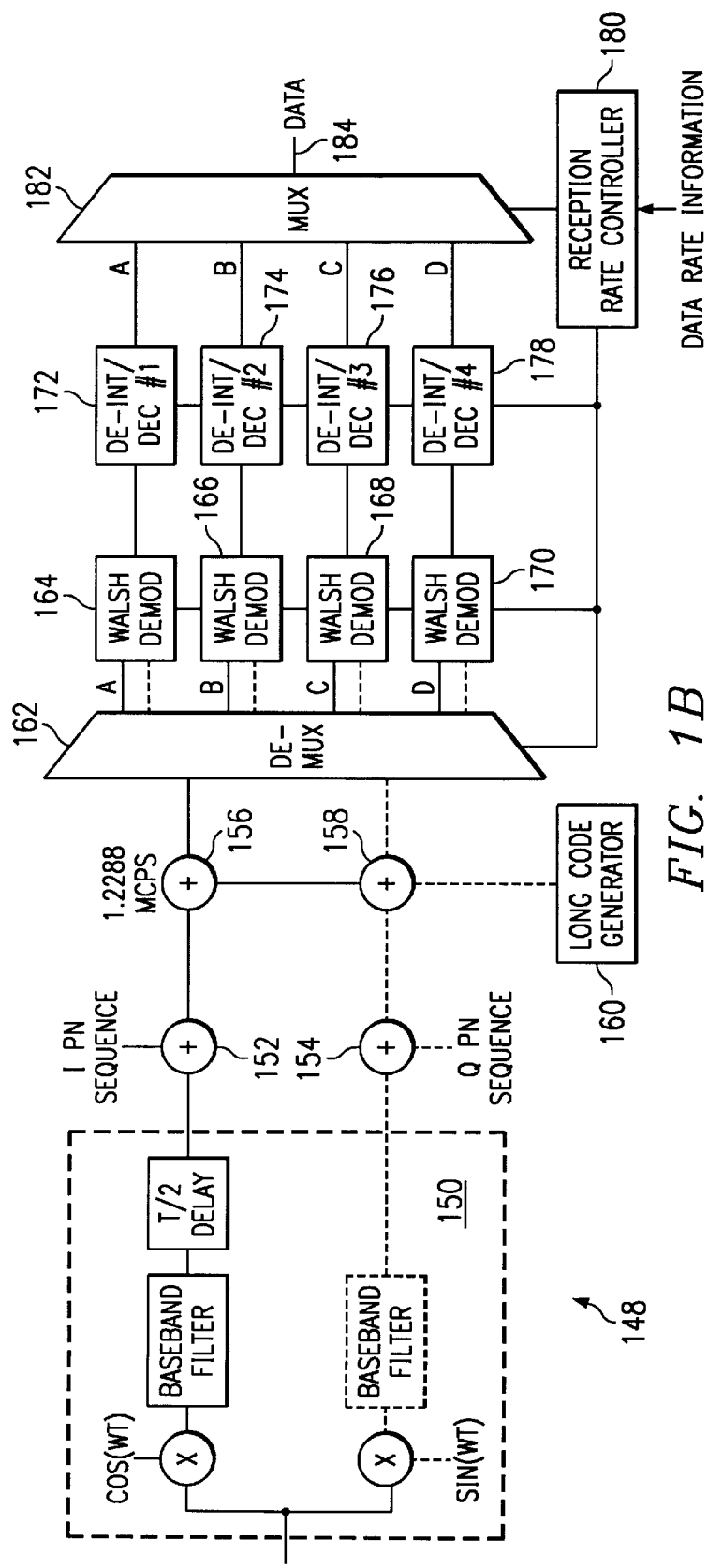
FIG. 1C is a block diagram that illustrates in greater detail the CC/INT block of FIG. 1A.

Referring now to FIG. 1A, therein is shown a schematic block diagram showing portions of a transmitter modulator 100 utilizing multiplexed subchannels according to an embodiment of the present invention. Transmitter modulator 100 includes a circuit referred to for convenience as a demultiplexer (DEMUX) 102, parallel convolutional coder/interleavers (CC/INT) 104, 106, 108, and 110, parallel Walsh modulators (Walsh mod) 112, 114, 116, and 118, data burst randomizer 120, MUX 122, transmission rate controller 124, long code generator 126, long code spreader 132, Q PN spreader 128, I PN spreader 130 and RF circuitry 138. FIG. 1C illustrates one suitable, but not limiting, embodiment of the CC/INT blocks 104–110, as known from, by example, IS-95. Transmitter modulator 100 receives input data on input 132 and generates output data to the RF circuitry 138 at outputs 134 and 136. An RF signal is then transmitted from the RF circuitry 138.

In the embodiment shown in FIG. 1A, transmitter modulator 100 utilizes a maximum of four possible parallel subchannels (or 'pipes') for carrying data, with each subchannel capable of carrying data between DEMUX 102 and MUX 122, for data transmission rate variation. The number of subchannels in use at any time depends on the data transmission rate requirements on transmitter modulator 100. The first subchannel is formed by the data transmission path through CC/INT 104, Walsh mod 112, and data burst randomizer 120, the second subchannel is formed by the data transmission path through CC/INT 106 and Walsh mod 114, the third subchannel is formed by the data transmission path through CC/INT 108 and Walsh mod 116, and the fourth subchannel is formed by the data transmission path through CC/INT 110 and Walsh mod 118. Although four parallel subchannels are shown as the maximum possible, more or less than a maximum of four subchannels may be provided in alternatives of the embodiment. Use of the parallel subchannels allows transmitter modulator 100 to be utilized in CDMA systems that provide data services with varying data transmission rate requirements. Different data transmission rate requirements can be met by using appropriate signal splitting and combining in DEMUX 102 and MUX 122 in combination with the addition or removal of subchannels, and by varying the parameters of the individual subchannels.

In the operation of transmitter modulator 100, digital data 132 is received at the input of DEMUX 102 and is modulated into data frames and input to RF circuitry 138 from output 134 of Q pilot spreader and output 136 of I pilot spreader. The modulation rates for each data frame are controlled by operating DEMUX 102 and MUX 122 at a rate determined by transmission rate controller 124. Transmission rate controller 124 receives data rate information prior to the beginning of each data frame from a central data link control processor (not shown) and generates the appropriate control signals to DEMUX 102 and MUX 122. The control signals generated to DEMUX 102 and MUX 122 determine the number of subchannels utilized and the amount of data processed in each subchannel.

The input circuit 102 is referred to as a DEMUX for convenience, as the input data stream 102 need not be a multiplexed data stream. In operation, the DEMUX 102 functions to direct the serial data to one of a plurality of destinations (i.e., to one of the CC/INTs 104–110).

Transmitter modulator 100 provides an advantage in that the number of subchannels and the parameters of the possible individual subchannels may be designed to be compatible with the transmission parameters of an existing system. The data transmission rate of the existing system can be increased without reducing Walsh modulator length, or reducing the channel encoding, or increasing the modulation level. Error rate performance of the system need not be reduced to increase the data rate. The data transmission frame length of the system can be the same at all data transmission rates. Compatibility with an existing system can be accomplished by setting the parameters of the first channel, so that transmitter modulator 100 operates as a modulator of the existing system, at the data transmission rate of the existing system, when only the first channel is in use. The data rate can then be increased by adding additional subchannels to carry additional data. Transmitter modulator 100 can be used within an existing system to increase the data transmission rate of selected transmitters without interfering with other transmitters that operate at the original slower rate. For example, transmitter modulator 100 can be designed to be compatible with the transmission parameters of the data rates specified for the CDMA uplink of IS-95-A. In the embodiment of FIG. 1A a predetermined algorithm may be used in transmission rate controller 124 to generate control signals from the data rate information. This predetermined algorithm may be configured so that full rate frames are formed whenever possible. In the configuration of transmitter modulator 100 that is designed for compatibility with IS-95-A, transmitter modulator 100 may be used with only the first subchannel enabled to provide data to the transmitter for transmission using 20 millisecond frames at the IS-95-A rates of 9.6 kbps for full rate, 4.8 kbps for half rate, 2.4 kbps for one-quarter rate, and 1.2 kbps for one-eighth rate. The data transmission rate can then be increased to 19.2 kbps by adding a second subchannel, and to 38.4 kbps by adding a third and fourth subchannel while retaining the 20 millisecond frame structure. In this embodiment, increasing the number of subchannels used by a factor of two, for each incremental increase in data transmission rate, allows the use of only one data burst randomizer 120 located in the first subchannel.

Figure 2A:
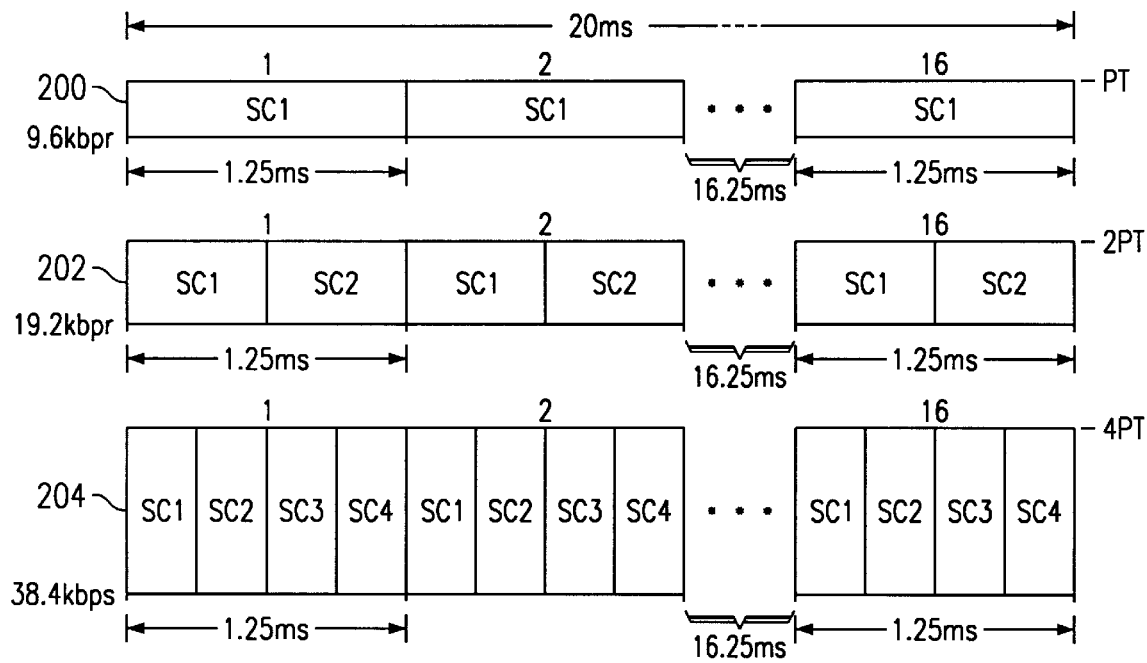
FIGS. 2A–2B are timing diagrams of transmitter modulator operation according to the embodiment of the invention shown in FIG. 1.
Figure 2B:
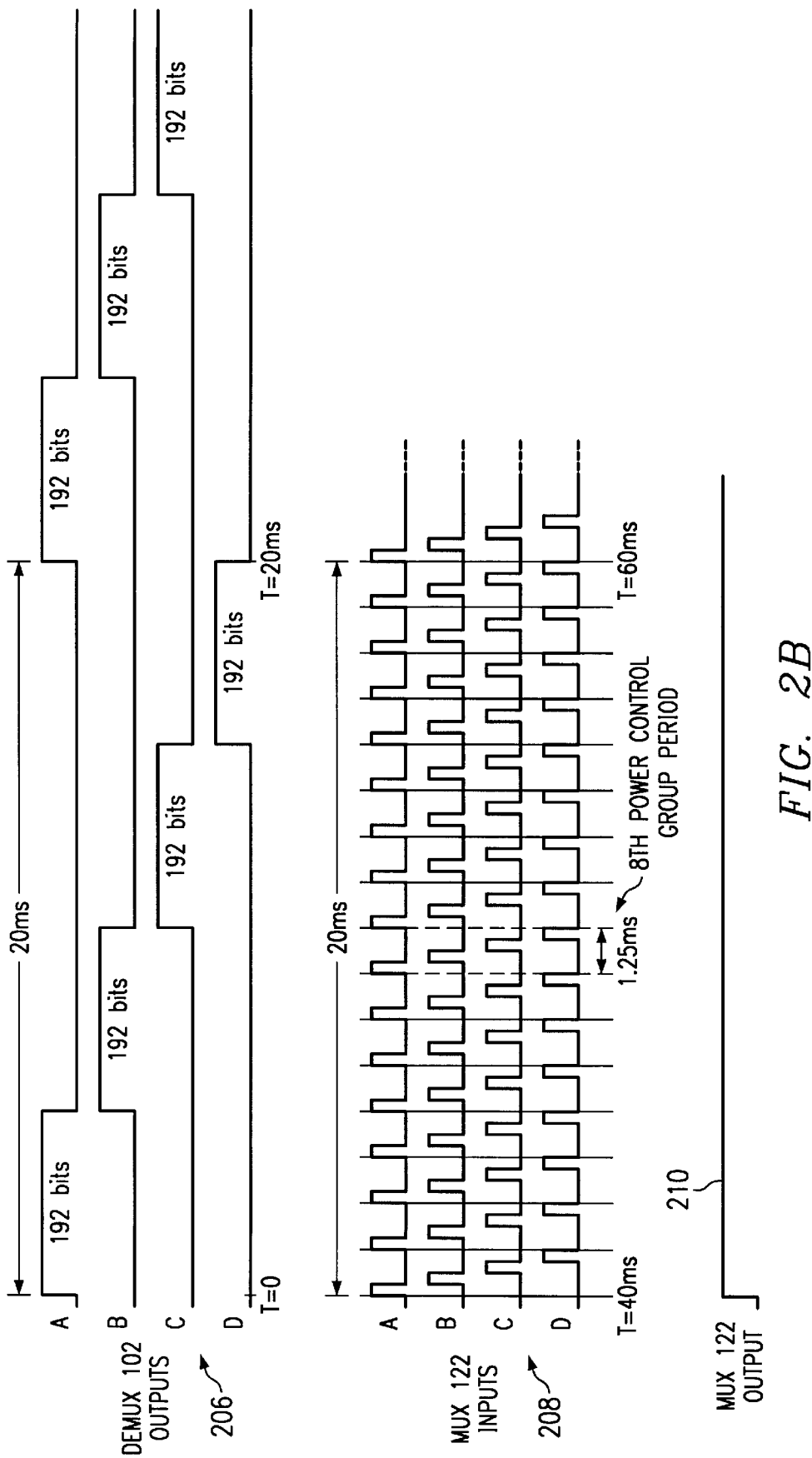

Referring now to FIGS. 2A and 2B, therein are illustrated timing diagrams of transmitter modulator 100 operation according to the embodiment of the invention shown in FIG. 1A. FIG. 2A illustrates the transmission timing of 1.25 ms. burst periods (power control group periods) within each of three different 20 millisecond frames for the configuration of transmitter modulator 100 that is compatible with IS-95-A. Frame 200 illustrates 9.6 kbps data transmission, frame 202 illustrates 19.2 kbps data transmission, and frame 204 illustrates 38.4 kbps data transmission. Each 20 millisecond frame 200, 202, 204 includes 16 power control group periods. The power control group periods 1, 2, and 16, of each frame are shown. The right hand scale of FIG. 2 also shows the transmit power used for each frame relative to a constant power level PT used at 9.6 kbps. FIG. 2B illustrates internal signal timing within transmitter modulator 100 within a series of 20 millisecond frames for 9.6 kbps data transmission. Diagram 206 illustrates the timing of the output signals of DEMUX 102, diagram 208 illustrates the timing of the inputs of MUX 122, and diagram 210 illustrates the output of MUX 122.

When transmitter modulator 100 modulates a 20 millisecond frame of 9.6 kbps or slower (4.8, 2.4, or 1.2 kbps) data, only the first subchannel, formed by the data path through CC/INT 104, Walsh mod 112 and data burst randomizer 120 is used. The first subchannel functions in this case as a conventional IS-95 modulator. Transmission rate controller 124 receives, prior to transmitter modulator 100 receiving the data to be modulated at input 132, data rate information indicating the modulation rate to be used for the next frame or a number of next frames. Transmission rate controller 124 then generates the appropriate signals to DE MUX 102 and MUX 122. DEMUX 102 then switches all received data to CC/INT 104 where the data is convolutionally encoded at the rate of $r=\frac{1}{3}$, $k=9$, and interleaved over each 20 millisecond frame as in IS-95-A. Each 6 bits (one Walsh symbol) output from CC/INT 104 is then modulated in Walsh mod 112 as one of 64 modulation symbols. If the data transmission rate is less than 9.6 kbps., data burst randomizer then also randomizes the locations of the power control group bursts used within each 20 millisecond frame. For example, if half rate (4.8 kbps) is used data burst randomizer randomizes the locations of the eight 1.25 millisecond power control groups used to carry the transmission in each half rate 20 millisecond frame. For a rate of 9.6 kbps, the data is received at MUX 122 at a rate of a 4800 sps (4800 Walsh modulation symbols per second). For slower rates the Walsh symbol rate is proportionately reduced. MUX 122 then switches the modulation symbols received from data burst randomizer 120 of the first subchannel to long code spreader 132. Long code spreader 132 then spreads each Walsh chip at rate of 1.2288 mcps. The modulation symbol burst transmission rate is fixed at 4800 sps which results in a Walsh chip transmission rate of 307.2 kcps. At a chip transmission rate of 307.2 kcps each Walsh chip is spread by four PN chips. The spread Walsh symbols are then spread by an I PN sequence in I PN spreader 128 and a Q PN sequence in Q PN spreader 130 for transmission on the I and Q channels, respectively, and input to RF circuitry 138. The data is then transmitted at the power level PT as shown in diagram 200 of FIG.2A, with subchannel 1 data (SCl) filling 1.25 millisecond power control group periods of the 20 millisecond frame, with the number of frames filled depending on the data rate.

When data is to be transmitted at the 38.4 kbps rate, all four subchannels of modulator 100 are used. As shown in timing diagram 204 of FIG. 2A, at the 38.4 kbps data transmission rate each 1.25 millisecond power control period of each 20 millisecond frame includes data from each of the first subchannel (SC1), the second subchannel (SC2), the third subchannel (SC3), and the fourth subchannel (SC4).

In the case of 38.4 kbps data transmission, controller 124 receives data rate information indicating that the 38.4 kbps modulation rate is to be used for the next frame or a predetermined number of next frames prior to transmitter modulator 100 receiving the data to be modulated at input 132. Transmission rate controller 124 then generates the appropriate signals to DENUX 102 and MUX 122. DEMUX 102 then allocates the received 38.4 kbps data between CC/INT 104, CC/INT 106, CC/INT 108, and CC/INT 110 so that data is input to each subchannel at the rate of 9.6 kbps. Diagram 206 of FIG. 2B illustrates timing of the output signals of DEMUX 102. At time T=0, each group of 192 bits, of the received 768 bits in a 20 millisecond period, is directed to outputs A,B,C and D for input to subchannel 1, 2, 3, and 4, respectively. Each of the four subchannels then operates on the data at the rate of 9.6 kbps in a similar manner to that which was described above for the first channel in the case of a 9.6 kbps transmission rate, except that since all four subchannels operate in parallel on data received at 9.6 kbps which is equivalent to full rate on a single channel, data burst randomizer 120 does not randomize data. The interleaving is done over a 20 millisecond period. The data is then output from the subchannels beginning at T=40 millisecond. Diagram 208 of FIG. 2B illustrates the data as received at MUX 122 on inputs A,B,C, and D from subchannel 1,2,3, and 4, respectively. The data is presented such so that data from each of the subchannels fills one quarter of each of the 1.25 millisecond power control group periods beginning at time T=40 millisecond. The data is received on each input at the rate of 4800 modulation symbols per second. As shown in diagram 210 of FIG. 2B, MUX 122 then multiplexes the data to long code spreader 132 at a rate four times that of the 4800 sps. (Walsh modulation symbol per second) rate received from each single subchannel or, equivalently, at a rate of 1228800 chips per second (1228.8 kcps). MUX 122 may perform the multiplexing at the symbol or chip level. Long code spreader 132 then spreads each Walsh chip at a rate of 1.2288 mcps. At a chip transmission rate of 1228.8 kcps, each Walsh chip is spread by 1 PN chip. The spread Walsh symbols are then spread by an I PN sequence in I pilot spreader 128 and Q PN sequence in Q PN spreader 130 for transmission on the I and Q channels, respectively, and input to RF circuitry 138. Because of this reduction in the spreading of the Walsh chips as compared to the 9.6 kbps data transmission, the transmission power is increased over the 9.6 kbps data transmission by a factor of four to 4 PT in order to keep the power per transmitted symbol constant. The data is then transmitted at the power level 4 PT as shown in diagram 204 of FIG.2A, with data from subchannel 1(SC1), subchannel 2(SC2), subchannel 3(SC3), and subchannel 4(SC4) filling each 1.25 millisecond power control group period of the 20 millisecond frame.

When it is desired to transmit data at 19.2 kbps, the first and second subchannels of transmitter modulator 100 are used. As shown in timing diagram 202 of FIG. 2, at 19.2 kbps each 1.25 millisecond power control period of a transmitted 20 millisecond frame includes data from both the first subchannel (SC1) and second subchannel (SC2).

In the case of 19.2 kbps data transmission, controller 124 receives data rate information indicating that the 19.2 kbps modulation rate is to be used for the next frame or a number of next frames prior to transmitter modulator 100 receiving the data to be modulated at input 132. Transmission rate controller 124 then generates the appropriate signals to DEMUX 102 and MUX 122. DEMUX 102 then allocates the received 19.2 kbps data between CC/INT 104 and CC/INT 106 so that data is input to each of CC/INT 104 of subchannel 1 and CC/INT 106 of subchannel 2 at the rate of 9.6 kbps. At time T=0, each group of 192 bits, of the received 584 bits in a 20 millisecond period, is directed to outputs A and B, for input to subchannels 1 and 2, respectively. Each of the first and second subchannels then operates on the data that is received at the rate of 9.6 kbps in a manner similar to that which was described above for the first subchannel in the case of the 9.6 kbps transmission rate, except that since both subchannels operate in parallel on data received at 9.6 kbps, which is equivalent to full rate on each channel, data burst randomizer 120 is not used. The interleaving in each channel is done over the 20 millisecond period. The data is then received at inputs A and B of MUX 122 at T=40 millisecond with the data filling one half of each 1.25 millisecond power control group period in a 20 millisecond frame. MUX 122 then multiplexes the data output from Walsh mods 112 and 114 of the first and second subchannels, respectively, to long code spreader 132 at a rate double that of the 4800 kbps rate received on the outputs of each Walsh mod 112 or 114, or equivalently, at a rate of 614.4 kcps. Long code spreader 132 then spreads each Walsh chip at a rate of 1.2288 Mcps. At a chip transmission rate of 614.4 kcps, each Walsh chip is spread by 2 PN chips. The spread Walsh symbols are then spread by an I PN sequence in I PN spreader 128 and Q PN sequence in Q PN spreader 130 for transmission on the I and Q channels, respectively, and sent to RF circuitry 1200. Because of this reduction in the spreading of the Walsh chips, as compared to the 9.6 kbps data transmission, the transmission power is increased in 19.2 kbps data transmission by a factor of two to 2 PT in order to keep the power per transmitted bit constant. The data is then transmitted at the power level 2 PT as shown in diagram 202 of FIG. 2A, with data from subchannel 1(SC1) and subchannel 2(SC2) filling each 1.25 millisecond period of the 20 millisecond frame.

Referring now to FIG. 1B, therein is a schematic block diagram showing portions of a receiver/demodulator for receiving data on multiplexed subchannels according to an embodiment of the present invention. Receiver demodulator 148 includes receiver circuitry 150, I PN despreader 152, Q PN despreader 154, long code generator 160, I long code despreader 156, Q long code despreader 158, demultiplexer (DEMUX) 162, Walsh demodulators (Walsh Demod) 164, 166, 168, and 170, deinterleavers/decoders (Deint/Dec) 172, 174, 176, and 178, MUX 182 and reception rate controller 180.

When a signal transmitted from a transmitter modulator, such as transmitter modulator 100, is received at receiver demodulator 148, the I channel signal is despread in I PN despreader 152, and the Q channel signal is despread in Q PN spreader 154. Each signal is then despread in long code generator 160 or 162. De-MUX 162 then demultiplexes the received data in a manner that is the reverse of the manner in which MUX 122 multiplexed the data in transmitter modulator 100. Each output A,B,C,D of DE-MUX 162 includes a I channel signal (solid line) and a Q channel signal (broken line). The demultiplexing in De-MUX 162 is done at the same rate as is the multiplexing in the transmitter/modulator by MUX 122. It is assumed that data rate information has been received at reception rate controller 180 before the data signal is received, and the reception rate controller 180 generates appropriate control information so that DEMUX 162, Walsh Demods 164–170, De-int/Decs 172–178, and MUX 182 demodulate the received data properly. For example, for a data reception rate of 38.4 kbps the input of DEMUX 162 at each channel (I and Q) would be identical to diagram 210 of FIG. 2B, while the outputs A,B,C, D of DEMUX would be identical to the waveforms A,B,C,D, respectively for the outputs of MUX 122 shown in diagram 208. Each Walsh Demod. De-int/Dec pair then processes the data and the processed data is input to inputs A,B,C,D, of MUX 182 192 bits at a time. The waveforms of data input to inputs A,B,C,D of MUX 182 may be identical to the waveforms for outputs A,B,C,D, respectively, of DEMUX 102 shown in diagram 206. Transmitter modulator 100 thus provides an apparatus for increasing the data transmission rate of an existing system. Transmitter modulator 100 can be implemented in an existing system without reducing the Walsh modulator length, reducing the channel encoding, or, increasing the I/Q modulation level. The Walsh modulator length, the channel encoding, and the I/Q modulation level can remain the same throughout the system while new devices using transmitter modulators operating according to the embodiment of transmitter modulator 100 are introduced and operated at higher data transmission rates. Furthermore, because each subchannel interleaves data over a period of time equal to the data transmission frame time, the effects of increasing the data rate on spurious interference sensitivity are reduced.

Figure 3:
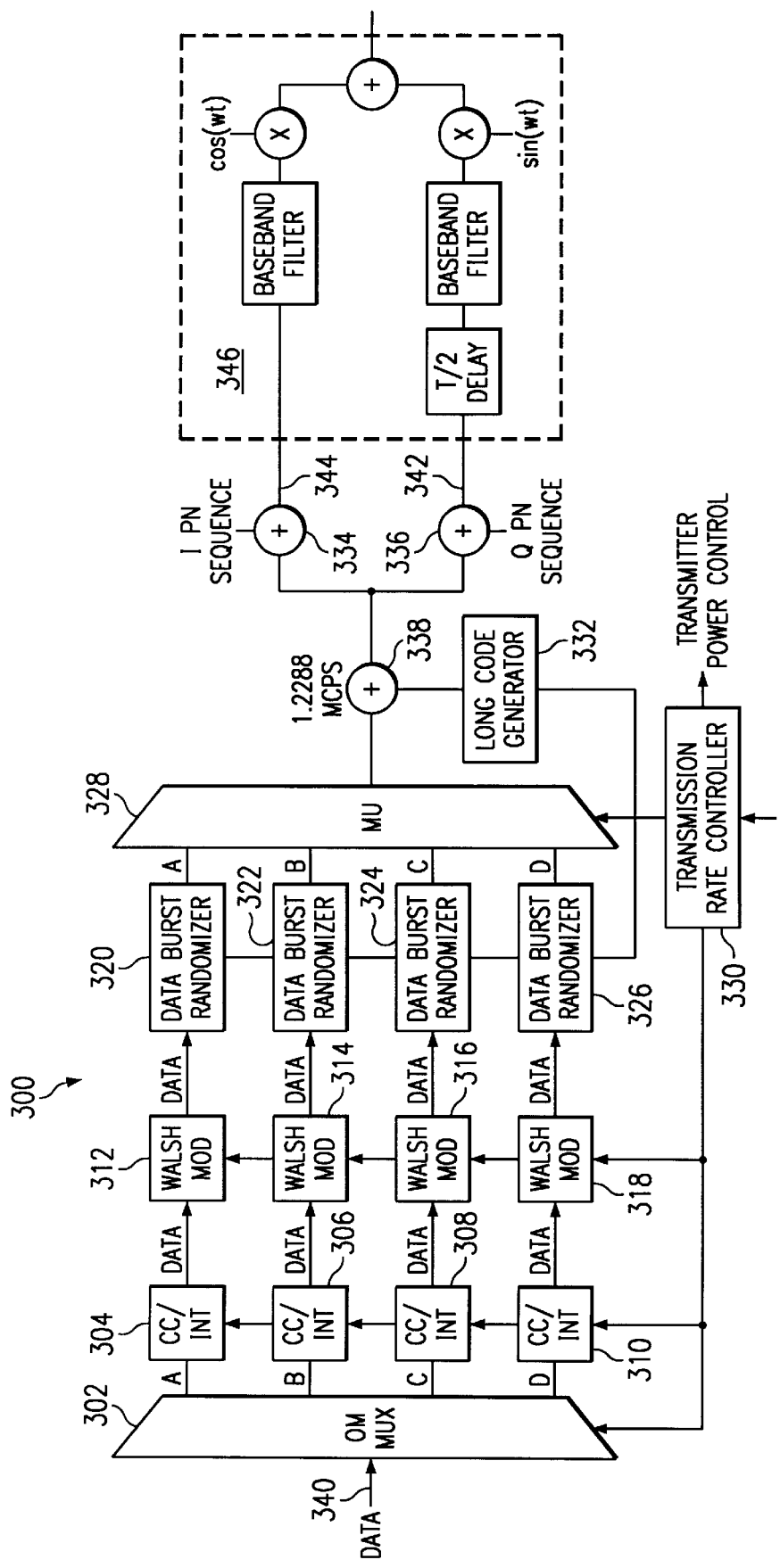
FIG. 3 is a schematic block diagram showing portions of a transmitter modulator utilizing multiplexed subchannels according to another embodiment of the invention.

Referring now to FIG. 3, therein is a schematic block diagram showing portions of a transmitter modulator 300 utilizing multiplexed subchannels according to another embodiment of the invention. Transmitter modulator 300 provides the same data transmission rate increase capability and advantages as transmitter modulator 100 but also allows transmission at incremental data transmission rates between the data transmission rates obtainable with transmitter modulator 100. Transmitter modulator 300 includes demultiplexer (DEMUX) 302, parallel convolutional coder/interleavers (CC/INT) 304, 306, 308 and 310, parallel Walsh modulators (Walsh mod) 312, 314, 316 and 318, data burst randomizers 320, 322, 324 and 326, MUX 328, transmission rate controller 330, long code generator 332, long code spreader 338, Q PN spreader 336, and I PN spreader 334. Transmitter modulator 300 receives input data on input 340 and generates output data to RF circuitry 346 at outputs 334 and 336 for transmission. In the embodiment shown in FIG. 3, transmitter modulator 300 utilizes four parallel subchannels, each capable of carrying data between DEMUX 102 AND MUX 328, for data transmission rate variation. In this embodiment, each of the four subchannels is always allocated a quarter period (0.3125 millisecond) of each of the sixteen 1.25 millisecond power control group transmission periods of each transmitted 20 millisecond frame. Depending on the data transmission rate requirements, each of the four subchannels may or may not carry data transmissions in the 0.3125 millisecond period allocated to it in a particular 20 millisecond frame. The first subchannel is formed by the data transmission path through CC/INT 304, Walsh mod 312 and data burst randomizer 320, the second subchannel is formed by the data transmission path through CC/INT 306, Walsh mod 314, and data burst randomizer 322, the third subchannel is formed by the data transmission path through CC/INT 308, Walsh mod 316, and data burst randomizer 324, and the fourth subchannel is formed by the data transmission path through CC/INT 310, Walsh mod 318, and data burst randomizer 326. Although four possible parallel subchannels are shown, alternatives of the embodiment having more or less than four subchannels are possible.

Transmitter modulator 300 can be designed to be compatible with the transmission parameters of the data rates specified for the CDMA uplink of IS-95 as specified in the document TIA/EIA/IS-95-A. In the configuration of Modulator 300 that is designed for compatibility with IS-95-A, modulator 300 may be used to provide data for transmission at the IS-95-A rates of 9.6 kbps for full rate, 4.8 kbps for half rate, 2.4 kbps for one-quarter rate, and 1.2 kbps for one-eighth rate using 20 millisecond frames. The data transmission rate can also be increased to 19.2 kbps, 28.8 kbps, or to 38.4 kbps. Also by operating channels in varying increments of full rate data, transmission rates between 9.6 kbps, 19.2 kbps, 28.8 kbps, and 38.4 kbps can obtained. Transmission rate controller 330 may generate control signals to DEMUX 302 to select the subchannels according to a predetermined algorithm, so that full rate frames are formed whenever possible.

In the operation of transmitter modulator 300, digital data is received at input 340 of DEMUX 302 and modulated into 20 millisecond frames that transmitter modulator 300 sends to the RF circuitry 346 from outputs 342 and 344. Transmission rate controller 330 receives data rate information prior to the beginning of each 20 millisecond frame from a central control processor (not shown) and generates the appropriate control signals to DEMUX 302 and MUX 328. Depending on the rate of the data received on input 340, DEMUX 302 allocates data received at input 340 so that data is received on at least one of the inputs of CC/INT 304, CC/INT 306, CC/INT 308, and CC/INT 310 at a rate of 9.6 kbps or less, i.e., half (4.8 kbps), quarter (2.4 kbps) or eighth rate (1.2 kbps). If data is received on input 340 at 9.6 kbps DEMUX 302 switches data to only the first subchannel. If data is received on input 340 at 19.2 kbps, the data is allocated between the first and second subchannels. If data is received at 28.8 kbps the data is allocated between the first, second and third subchannels. If data is received at 38.4 kbps, the received data is allocated between all four subchannels. MUX 328 then multiplexes the data from each subchannel onto the appropriate 0.3125 millisecond period of each power control group in each 20 millisecond frame and inputs the data to spreader 338.

Figure 4A:
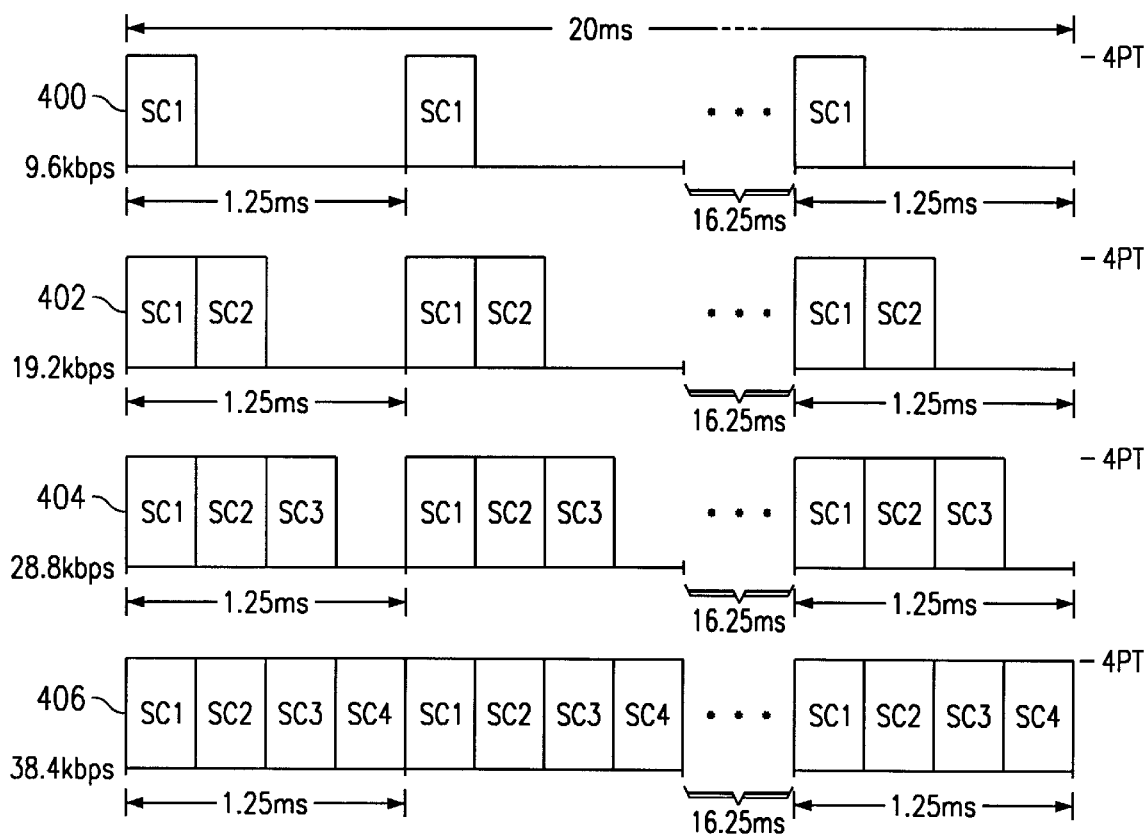
FIGS. 4A–4B are timing diagrams of transmitter modulator operation according to the embodiment of the invention shown in FIG. 3.
Figure 4B:
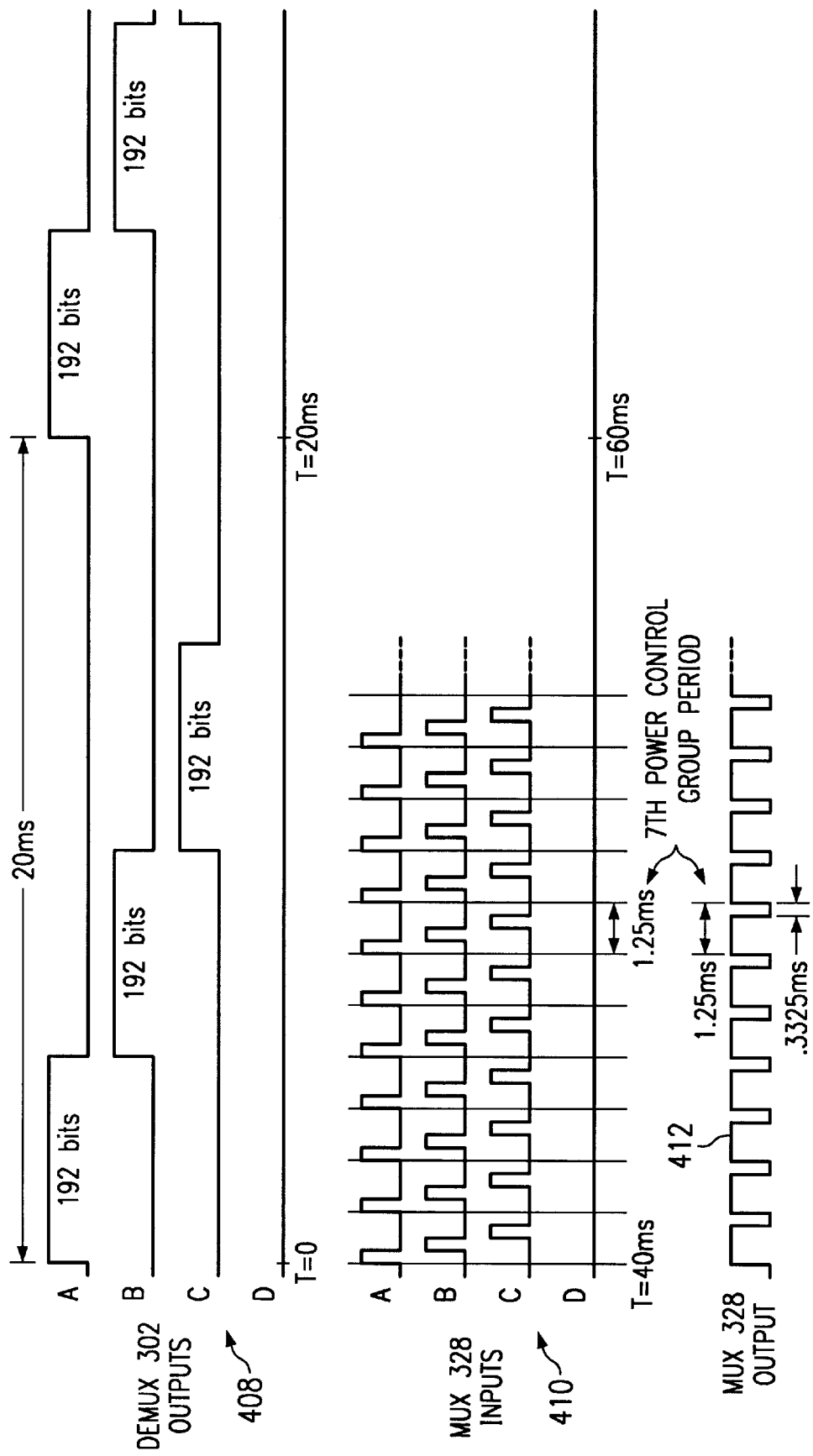

Referring now to FIGS. 4A and 4B, therein are illustrated timing diagrams of uplink transmissions according to the embodiment of the invention shown in FIG. 3. FIG. 4A illustrates the transmission timing of three 1.25 millisecond power control group periods within each of four different 20 millisecond frames 400–406 for the configuration of the transmitter modulator 300 that is compatible with IS-95-A. Frame 400 illustrates 9.6 kbps data transmission, frame 402 illustrates 19.2 kbps data transmission, frame 404 illustrates 28.8 kbps data transmission, and frame 406 illustrates 38.4 kbps data transmission. The first, second, and last power control group periods of each frame are shown. The right hand scale of FIG. 4 also shows the transmit power relative to the value PT of FIG. 2. FIG. 4B illustrates internal signal timing within transmitter modulator 300 within a series of 20 millisecond frames for 28.8 kbps data transmission. Diagram 408 illustrates timing of the output signals of DE MUX 302, diagram 410 illustrates timing of the inputs of MUX 328, and diagram 412 illustrates the output of MUX 328.

When data is to be transmitted at a rate of 9.6 kbps or less, DEMUX 302 switches the received data to the first subchannel that is formed by the transmission path through CC/INT 304, Walsh mod 312, and data burst randomizer 320. The first subchannel then operates on the data in a manner equivalent to that which was described for the embodiment of FIG. 1A for the first subchannel in the case of a 9.6 kbps or slower transmission rate. However, Walsh modulator 312 outputs the data within the first 0.325 millisecond of each 1.25 millisecond power control group period in a 20 millisecond frame, as opposed to a whole 1.25 millisecond period. The result at the output of Walsh mod 312 is a stream of Walsh symbols at the rate of 4.8 ksps. For data rates less than 9.6 kbps the symbol rate is proportionately reduced by causing one or more of the quarter periods to be empty of data. For 4.8 kbps, 2.4 kbps, or 1.2 kbps data rates the data burst randomizer 320 may be used to randomize the power control group period used and its location in a frame. Each frame is then spread in spreader 338, I PN spreader 334, and Q PN spreader 336. As shown in frame, 400 of FIG. 4A, at a data transmission rate of 9.6 kbps, one 0.325 millisecond period of each 1.25 millisecond power control group period is filled with the data from the first subchannel (SC1). For data rates less than 9.6 kbps, one 0.325 millisecond period of each of an appropriate number of control group periods, of less than the total number of each of the sixteen power control group periods, is filled with data. Also, data burst randomizer 320 randomizes the location on the data among the control groups in the case of data rates less than 9.6 kbps. No symbols are sent during the time of the 1.25 millisecond period other than the 0.325 millisecond period used for SC1. The actual modulation symbol burst transmission rate for this embodiment is fixed at a rate of 19.2 ksps, which results in an actual Walsh chip burst transmission rate of 1.2288 mcps. Since long code spreader 332 spreads each Walsh chip at a rate of 1.2288 mcps., each Walsh chip is spread by one PN chip. The spread Walsh symbols are then spread by an I PN sequence in I PN spreader 334 and a Q PN sequence in Q PN spreader 336 for transmission on the I and Q channels, respectively, and sent to the RF portion of the transmitter. In order to keep the energy per transmitted bit constant the data is transmitted at four times the rate as compared to the single channel case of the embodiment of FIG. 1A.

When data is transmitted at a rate of 19.2 kbps, two subchannels are used. Frame 402 of FIG. 4A illustrates the case of 19.2 kbps data transmission. At the 19.2 kbps rate subchannel 1 (SC1) and subchannel 2 (SC2) fill the first and second 0.325 millisecond periods of each 1.25 millisecond power control group period in each 20 millisecond frame. In the case of data transmission at 19.2 kbps, 19.2 kbps data received at input 340 of DEMUX 302 is directed into the first and second subchannels of transmitter modulator 300 at a rate of 9.6 kbps for each subchannel. The data is then processed in each of the subchannels in a manner identical to that in which the first subchannel processes data for transmission at 9.6 kbps, as was described for frame 400. Data processed in the first and second subchannel paths of transmitter modulator 300 is then multiplexed and compressed by MUX 328 into transmit subchannel 1 (TC1) and transmit subchannel 2 (TC2), respectively, of each 1.25 millisecond power control group period of each 20 millisecond frame. The symbols output from MUX 328 are then processed in a manner identical to that in which symbols are processed for 9.6 kbps data transmission and sent to the RF circuitry 346.

When data is transmitted at a rate of 28.8 kbps, 28.8 kbps data received at input 340 of DEMUX 302 is directed into the first, second, and third subchannels of transmitter modulator 300 at a rate of 9.6 kbps for each subchannel. Diagram 408 of FIG. 4B illustrates the outputs of DEMUX 302. Beginning at T=0, each group of 192 bits in the 576 bits received in a 20 millisecond period at input 340 is directed to one of outputs A,B, and C of DEMUX 302. The data is then processed in each of the subchannels in a manner similar to that in which the first subchannel processes data for transmission at 9.6 kbps, as was described for frame 400. At T=40 millisecond the data from subchannels 1,2, and 3, is input to inputs A, B, and C, respectively, of MUX 328. Diagram 410 illustrates the input timing of MUX 328. The data from each of subchannels 1,2, and 3 is received in the first, second, and third 0.325 millisecond period, respectively, of each 1.25 millisecond period of each 20 ms data frame. The fourth 0.325 millisecond period of each 1.25 millisecond period is left empty in the case of 28.8 kbps. The data is received at each input of A,B, and C at a Walsh symbol rate of 4.8 ksps. The data is then multiplexed by MUX 328. Diagram 412 illustrates the outputs of MUX 328. Data fills each of the first three of four 0.325 millisecond periods of each 1.25 millisecond period in the frame. The symbols output from MUX 328 are then processed, in a manner identical to that in which symbols are processed for 9.6 kbps data transmission, and sent to the RF portion of the transmitter. Frame 404 of FIG.4A illustrates a 20 millisecond transmission frame for the case of a 28.8 kbps data transmission rate. At the 28.8 kbps rate, data from subchannel 1 (SC1), data from subchannel 2 (SC2), and data from subchannel 3 (SC3) fills the first three of four 0.325 millisecond periods of each 1.25 millisecond power control group period of each 20 millisecond frame.

For a 38.4 kbps data transmission rate, all four 0.325 millisecond periods of each 1.25 millisecond power control group period in a 20 millisecond frame are used. Frame 406 of FIG. 4A illustrates a 38.4 kbps data transmission frame. The operation of transmitter modulator 300 is similar to that described for 28.8 kbps data transmission, which the exception that a fourth subchannel is enabled in transmitter modulator 300. 38.4 kbps data received at input 340 is directed into each of the four subchannels of transmitter modulator 300 at 9.6 kbps. The data is then processed in the subchannels and input to inputs A,B,C, and D of MUX 328 in the first, second, third, and fourth, respectively, 0.325 millisecond periods of each 1.25 millisecond time period of a 20 millisecond frame. The data is then multiplexed by MUX 328. At the output of MUX 328 data fills each of the four 0.325 millisecond periods of each 1.25 millisecond period in a 20 millisecond frame at the rate of 4.8 ksps for each input. Frame 406 of FIG. 4A illustrates a 20 millisecond transmission frame for the case of a 38.4 kbps data transmission rate. At the 38.4 kbps rate, data from subchannel 1 (SC1), data from subchannel 2 (SC2), data from subchannel 3 (SC3), and data from subchannel 4 (SC4) fills the first, second, third, and fourth, respectively, 325 millisecond periods of each 1.25 millisecond power control group period. The symbols output from MUX 328 are then processed, in a manner identical to that in which symbols are processed for 9.6 kbps data transmission, and sent to the RF circuitry 346 for transmission.

The receiver demodulator for receiving and demodulating the signal transmit by transmitter modulator 300 may be identical at the schematic block level to receiver demodulator 148 of FIG. 1b. In this case DEMUX 162 and MUX 182 would perform the reverse operations as DEMUX 102 and MUX 122. For example, at 28.8 kbps the input of De-MUX 162 would have a waveform identical to that shown in diagram 412, the outputs A,B,C, D of De-MUX 162 would have a waveforms identical to that shown in diagram 410 for A,B,C,D, respectively, and the inputs A,B, C, D of MUX 182 would have a waveform identical to that shown in diagram 408 for A,B,C,D, respectively.

The embodiment of FIG. 3 may also be used to support the transmission of data at incremental rates between 9.6 and 38.4 kbps by operating a subchannel at a rate less than 9.6 kbps. For example, data may be transmitted at a rate of 14.4 kbps by using DEMUX 302 to direct received 14.4 kbps data into the first and second channels at 9.6 kbps and 4.8 kbps, respectively, and then using the second subchannel at half rate. In this case the second 0.325 millisecond period of each 1.25 millisecond period power control group is filled in only eight of the sixteen power control group periods of each 20 millisecond frame.

Figure 5:
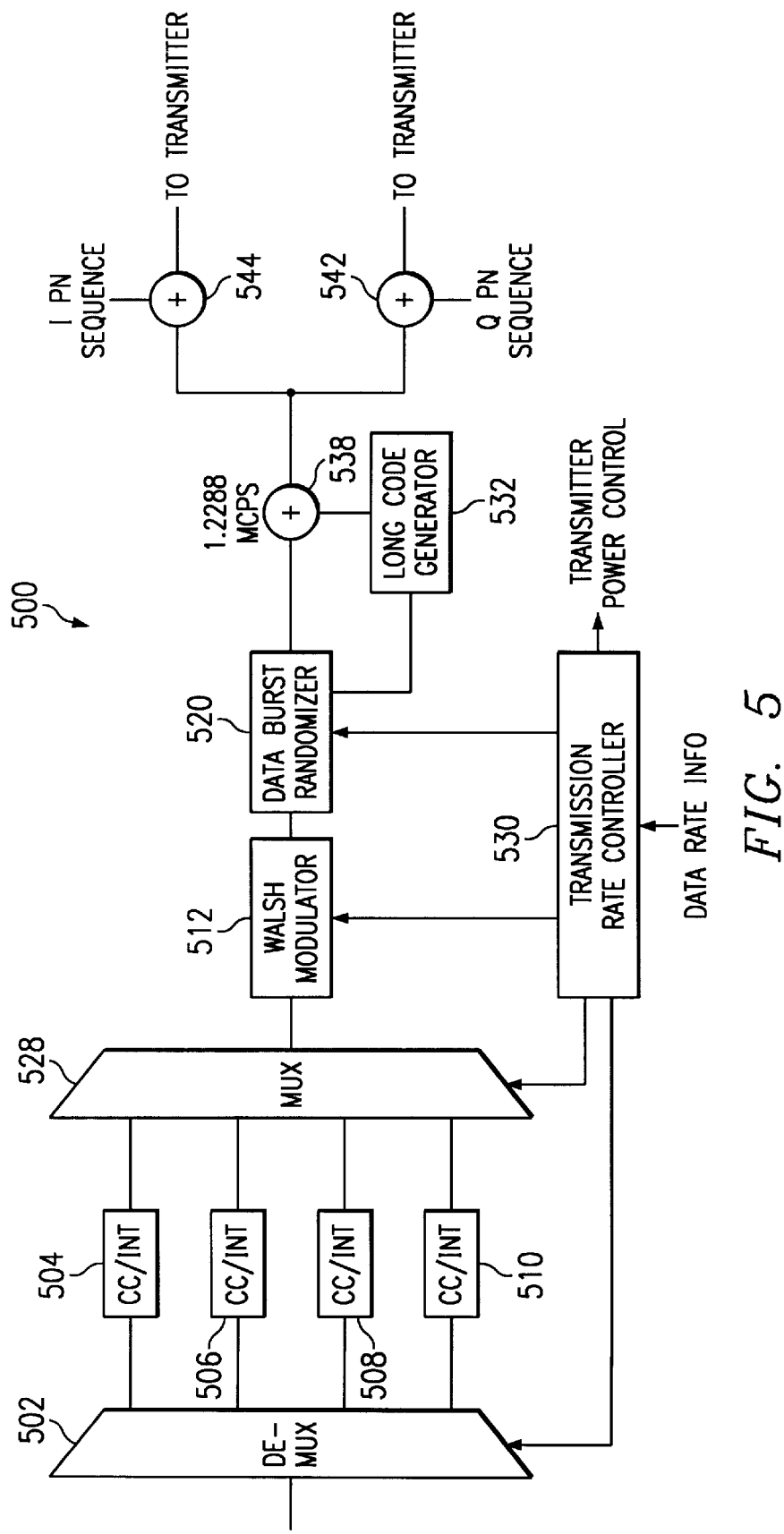
FIG. 5 is a schematic block diagram showing portions of an uplink transmitter according to an alternative of the embodiment of FIG. 3.

Referring now to FIG. 5, therein is a schematic block diagram showing portions of a transmitter modulator 500 according to an alternative of the embodiment of FIG. 3. Transmitter modulator 500 includes identical functional blocks as transmitter modulator 300 for FIG. 3, with the difference being that Walsh modulators 312–318 and data burst randomizers 320–326 are replaced by a single Walsh modulator 512 and data burst randomizer 520 and moved to the other side of the subchannel output of MUX 528. In transmitter modulator 500, subchannels 1,2,3, and 4 are formed by the data paths between DEMUX 502 and MUX 522 through CC/INTs 504, 506, 508, and 510, respectively. In transmitter modulator 500 the speed of operation of Walsh modulator 512 is increased above that of Walsh modulators 312–318 by a factor proportional to the number of subchannels used. The data frame transmission timing for transmitter modulator 500 is identical to that shown in FIG. 4A for transmitter modulator 300.

Figure 6:
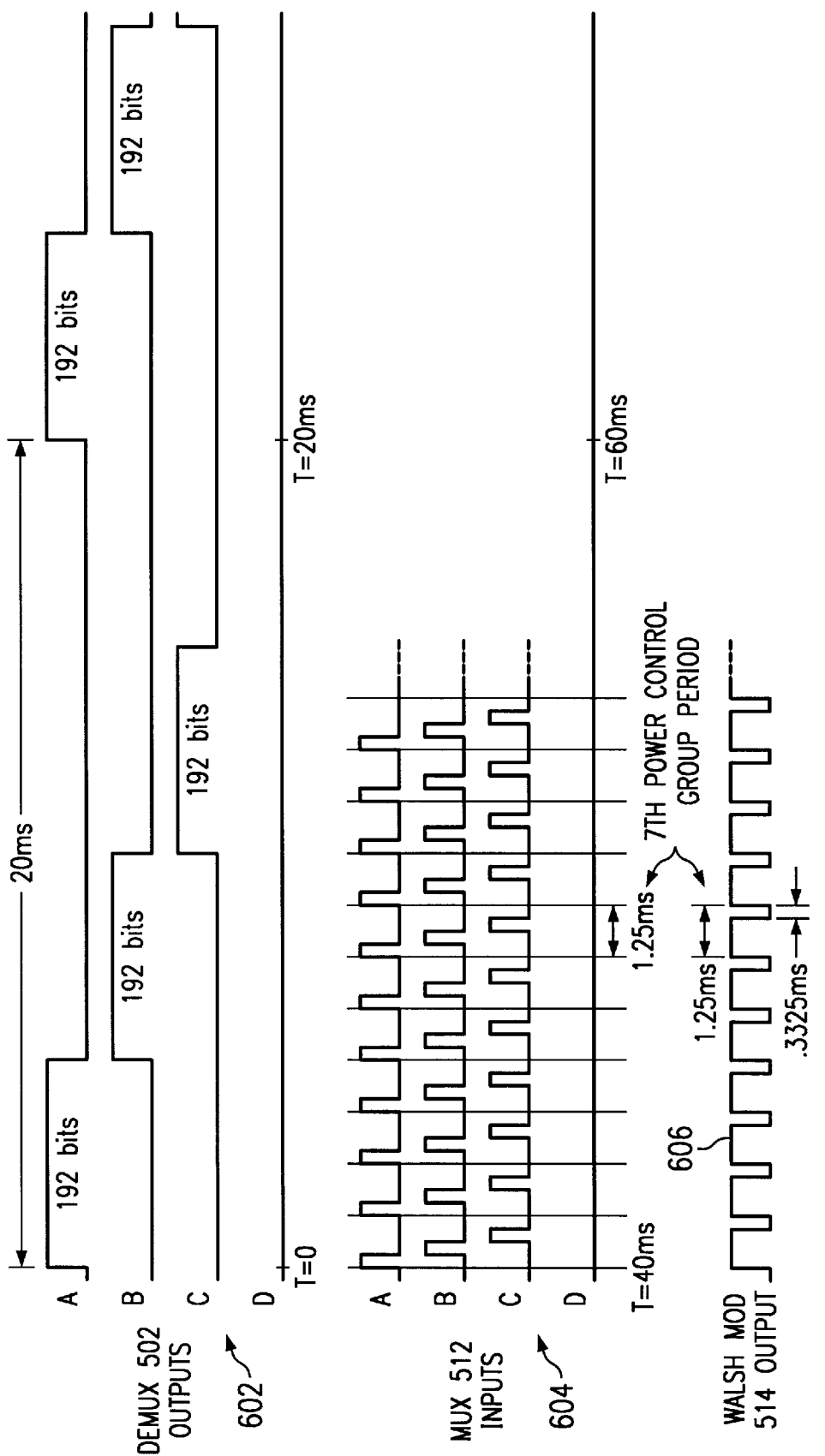
FIG. 6 is a timing diagram showing transmitter modulator operation according to the embodiment of the invention shown in FIG. 5.
Figure 7A:
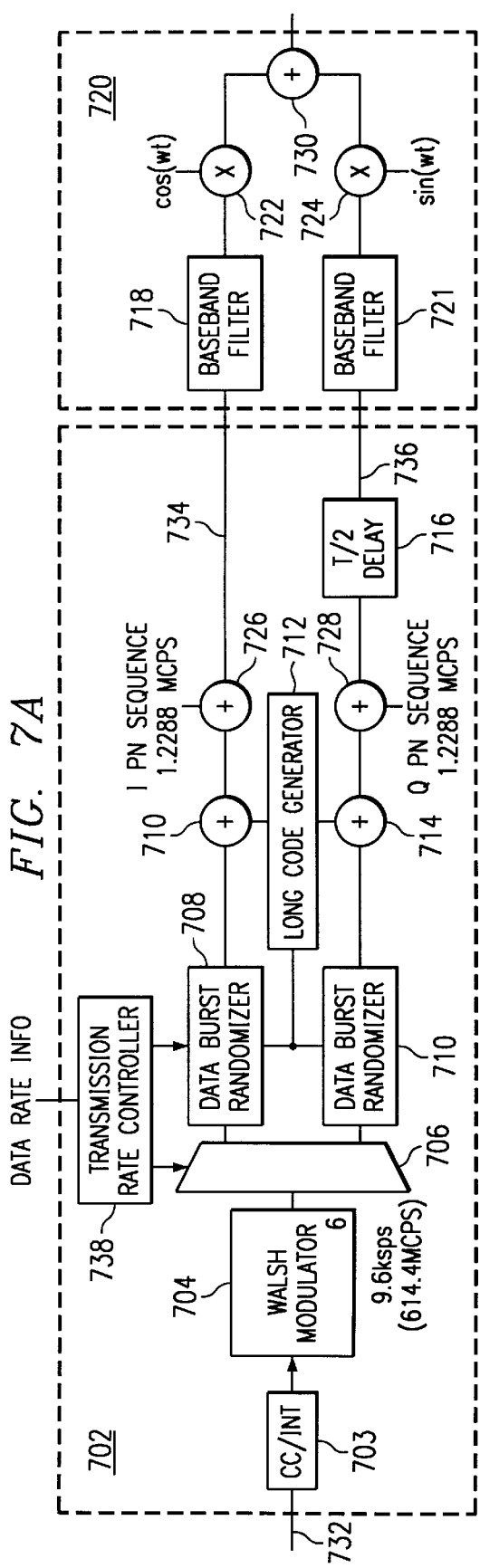
FIGS. 7A and 7B are schematic block diagrams showing portions of a transmitter modulator, and receiver demodulator, respectively, utilizing multiplexed I/Q channels according to a further embodiment of the invention.
Figure 7B:
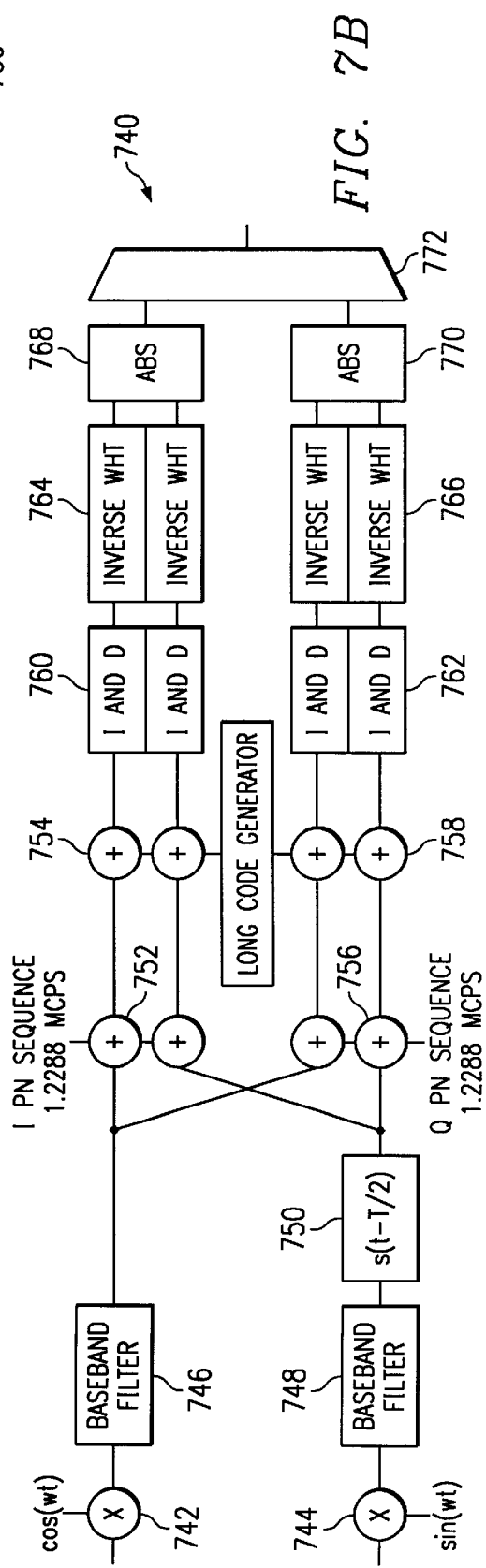

Referring now to FIG. 6, therein are illustrated timing diagrams showing transmitter modulator operation according to the embodiment of the invention shown in FIG. 5. The timing diagrams of FIG. 6 show internal signal timing for an exemplary data rate of 28.8 kbps. Diagram 602 illustrates the outputs of DEMUX 502, diagram 604 illustrates the inputs of MUX 512, and diagram 606 illustrates the output of Walsh modulator 514. In the operation of transmitter modulator 500, 28.8 kbps data is received on input 532 of DEMUX 502. Starting at T=0, each of the three 192 bit groups of the 576 bits in a 20 millisecond time period are directed to outputs A,B, and C of DEMUX 502 in the manner shown in diagram 602. The data from outputs A,B, and C is then input to subchannels 1,2, and 3, respectively. The data is convolutionally encoded and interleaved over a 20 millisecond time period in the appropriate subchannel and multiplexed at MUX 528 into Walsh modulator 512. As shown in diagram 604, the data is received at the inputs of MUX 512 from subchannels A,B, and C in the first, second and third 0.325 millisecond periods, respectively, of each 1.25 millisecond power control group period in the 20 millisecond frame beginning at T=40 millisecond. The fourth 0.325 millisecond period of each 1.25 millisecond period is left empty. Walsh modulator 512 receives the data at the rate of 3×28800 CC/INT code symbols per second, when 3 subchannels used. Walsh modulator 512 then outputs Walsh symbols to data burst randomizer 520 at the rate of 3×307.2 kcps as shown in diagram 606. The data is then spread in spreader 538, I PN spreader 534, and Q PN spreader 542 and sent to the RF circuitry (not shown). The data is transmitted identically as that shown in Frame 404 of FIG. 4A. At the 28.8 kbps rate, data from subchannel 1 (SC1), data from subchannel 2 (SC2), and data from subchannel 3 (SC3) fills the first three of four 0.325 millisecond periods of each 1.25 millisecond power control group period of the 20 millisecond frame. The transmission power is increased to 4 PT relative to the embodiment of FIG. 1A, when the embodiment of FIG. 1A is used at the 9.6 kbps data rate. Transmitter modulators 300 and 500 each provide an apparatus for increasing the data transmission rate of a CDMA system. The use of independent data burst randomizing for each channel allows for incremental increases in data transmission rate, with the lowest incremental increase being the lowest data rate available on a single subchannel. Transmitter modulators 300 and 500 can be implemented in an existing system without reducing Walsh modulator length, reducing the channel encoding, or increasing the I/Q modulation level. The Walsh modulator length, the channel encoding and the I/Q modulation level can remain the same throughout the system while new devices using transmitter modulators operating according to the embodiment of transmitter modulator 300 and 500 are introduced and operated at higher data transmission rates. Transmitter modulator 300 requires additional data burst randomizers as compared to transmitter modulator 100 of FIG. 1, and transmitter modulator 500 requires a Walsh modulator and data burst randomizer that is capable of operating at four times the speed of the Walsh modulators and data burst randomizers of transmitter modulators 100 and 300. Because each subchannel interleaves data over a period of time equal to the data transmission frame time, the effects of increasing the data rate on spurious interference sensitivity are reduced. Referring now to FIGS. 7A and 7B, therein are schematic block diagrams showing portions of a transmitter 700, and receiver 740, respectively, utilizing multiplexed I/Q channels according to a further embodiment of the invention. Transmitter modulator 702 includes convolutional encoder/interleaver (CC/INT) 703, Walsh modulator 704, multiplexer(MUX) 706, data burst randomizers 708 and 710, long code generator 712, long code spreaders 710 and 714, I PN spreader 726, Q PN spreader 728, and delay block 716. RF circuitry 720 includes baseband filters 718 and 721, cosine modulator 722, sine modulator 724, and combiner 730. Receiver 740 includes cosine demodulator 742, sine demodulator 744, baseband filters 746 and 748, delay block 750, I and Q PN despreaders 752 and 756, long code despreaders 754 and 758, integrator and dumpers (I&D) 760 and 766, inverse Walsh-Hadamard transform blocks (WHT) 764 and 766, absolute value blocks (ABS) 768 and 770 (e.g., $I^2+Q^2$), and multiplexer 772.

Transmitter modulator 700 receives data on input 732 and provides two different data streams to RF circuitry 720 at outputs 734 and 736. The use of two different data streams at outputs 734 and 736 allows independent modulation of each data stream onto a quadrature channel in RF circuitry 720. Simultaneous transmission on the quadrature channels increases the data transmission rate by a factor of two. Transmitter 700 may be used to transmit data at the rates of 2.4 kbps, 4.8 kbps, 9.6 kbps, and 19.2 kbps.

In the operation of transmitter modulator 702, transmission rate controller 738 receives, prior to transmitter modulator 700 receiving the data to be modulated at input 732, data rate information indicating the data rate to be used for the next frame or a number of next frames. Transmission rate controller then generates the appropriate signals to MUX 706, CC/INT 703, Walsh modulator 704, and data burst randomizers 708 and 710. When the data is received on input 732, CC/INT 703 convolutionally encodes and interleaves the data over a 20 millisecond period. For a 19.2 kbps data rate, code symbols are output from CC/INT 703 at the rate of 57.6 ksps, for a 9.6 kbps data rate the code symbol output rate of CC/INT 703 is 28.8 ksps, for a 4.8 kbps data rate the code symbol output rate of CC/INT 703 is 14.4 ksps, and for a data rate of 2.4 kbps the output rate of CC/INT 703 is 7.2 ksps. The data is then input to Walsh modulator 704 which modulates each six received bits onto one Walsh symbol. The Walsh symbols are then output from Walsh modulator 704 at the rate of 9.6 ksps for a 19.2 kbps data rate, 4.8 ksps for a 9.6 kbps data rate, 2.4 ksps for a 4.8 kbps data rate, or 1.2 ksps for a 2.4 kbps data rate. MUX 706 then multiplexes the received data at the symbol level between data burst randomizers 708 and 709. The data output from data burst randomizers 708 and 709 is then spread in long code spreaders 710 and 714, respectively, at a rate of 1.2288 mcps. The output long code spreader 710 is then spread by an I PN sequence in I PN spreader 726 and the output of long code spreader 714 is then spread by a Q PN sequence in Q PN spreader 728. The embodiment of transmitter 700 provides a signal detectable in a receiver using non-coherent detection techniques. Since each of the quadrature signals transmitted from transmitter 720 are modulated onto orthogonal Walsh symbols, co-channel interference between the two channels is reduced. Also, since multiplexing in MUX 706 is done at the Walsh symbol level, the orthogonality necessary for non-coherent detection of the Walsh symbols is maintained.

In receiver 740, the input data received on the I and Q channels is multiplied by the I PN sequence and Q PN sequence in despreader 752, and the same data is also multiplied by the I PN sequence and Q PN sequence in despreader 756. The outputs of each despreader are then multiplied by the long code in long code despreaders 754 and 758. By inputting data received on both channels into each despreader, the I channel information that has leaked into the Q channel and the Q channel information that has leaked into the I channel is recovered. The powers, rather than the amplitudes, of the two streams containing the I and Q data are combined. This is done to remove the effect of phase difference between the signals in the I and Q signals. Integrate and dump is then performed on the I and Q data in I&Ds 760 and 762. The integration time constants may be fixed, and are related to the Walsh chip rate. An inverse Walsh-Hadamard transform is then performed on the output of I&D 760 and 762 in Inverse WHTs 764 and 766, respectively, to determine the received 6 bit Walsh symbols. The Walsh symbols from each channel are then multiplexed in MUX 772 to a single data stream at the transmitted rate.

It is possible to combine dual I/Q channel modulation of the type shown in FIG. 7 with the use of parallel subchannels to further increase the maximum data rate. For example, dual I/Q channel modulation may be combined with the use of transmitter modulator 100 to increase the data rate by a factor of two above the maximum data rate of the embodiment of FIG. 1A.

Figure 8:
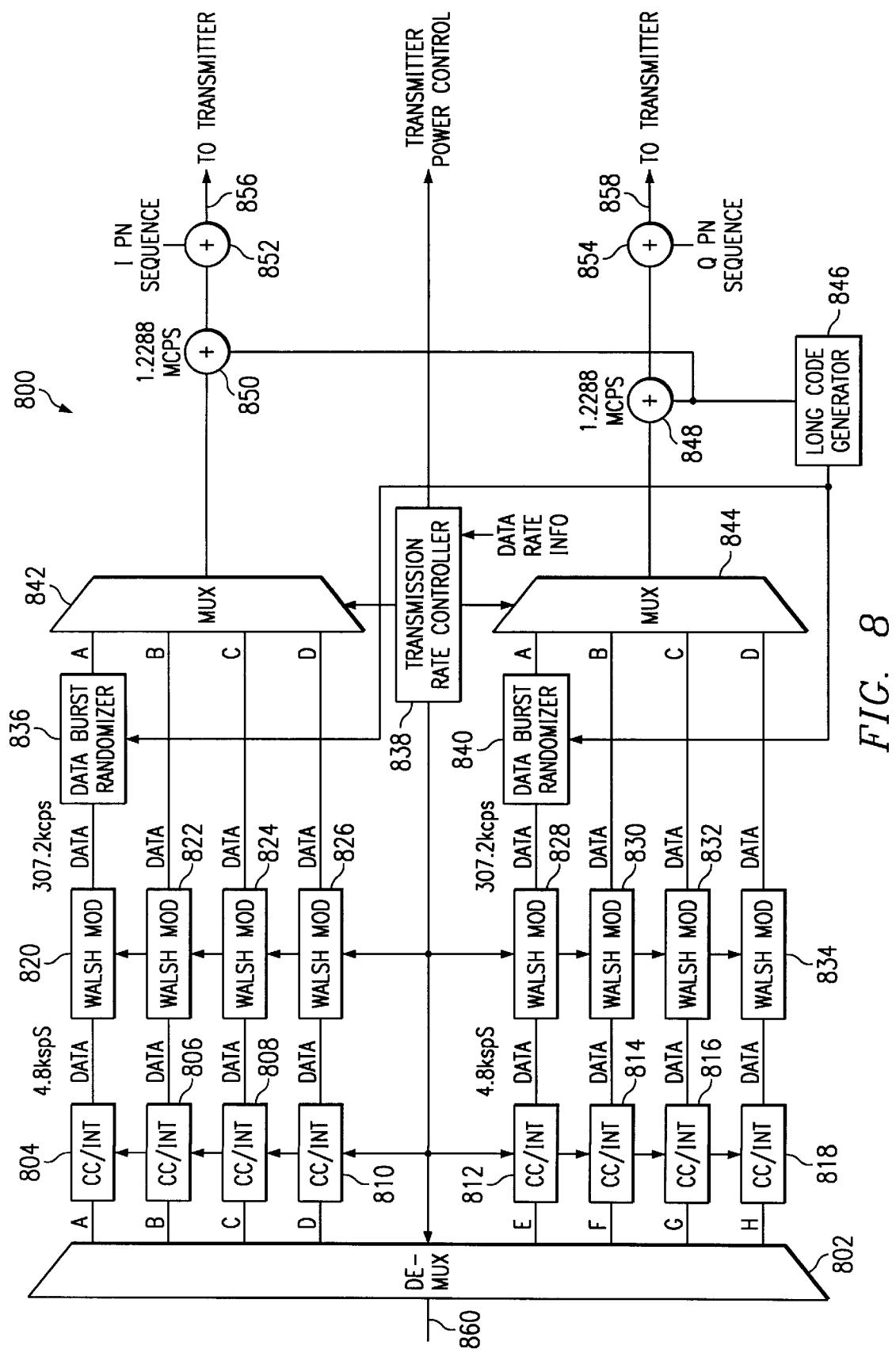
FIG. 8 is a schematic block diagram showing portions of a transmitter modulator utilizing combined multiplexed subchannel and multiplexed I/Q channel data modulation, according to an embodiment that combines the transmitter modulators of FIGS. 1 and 7A.

Referring now to FIG. 8, therein is a schematic block diagram showing portions of an transmitter modulator 800 utilizing combined multiplexed subchannel and multiplexed I/Q channel data modulation, according to an embodiment that combines the principles of the transmitter modulators of FIGS. 1 and 7A. Transmitter modulator 800 includes DEMUX 802, eight CC/INTs 804–818, eight Walsh modulators 820–834, data burst randomizers 836 and 840, MUXs 842 and 844, long code generator 846, long code spreaders 848 and 850, I PN spreader 852, and Q PN spreader 854. Transmitter modulator 800 receives data on input 860 and generates data to the RF portion of a transmitter, such as transmitter circuitry 138 of FIG. 1A at outputs 856 and 858. In the embodiment shown in FIG. 8, transmitter modulator 800 utilizes two sets of subchannels for a maximum of eight possible parallel subchannels. A set of a maximum of four subchannels are available for processing and carrying data between DEMUX 802 and MUX 842, and a set of a maximum of four subchannels is available for carrying data between DEMUX 802 and MUX 844. Each pair of one of the CC/INTs 804–818 and one of the Walsh mods 820–834 that forms a data path between DEMUX 802 and MUX 842 or DEMUX 802 and MUX 844 forms a subchannel. For example, CC/INT 804 and Walsh mod 820 form subchannel 1 for carrying data between DEMUX 802 and MUX 842. The number of subchannels in use from each set at any time depends on the data transmission rate requirements. The data from each set of four subchannels is then independently modulated onto one of two quadrature channels for simultaneous transmission. Although a maximum of eight parallel subchannels is shown more or less than four subchannels may be provided in alternative embodiments of the invention. Similarly to the transmitter modulator 100 of FIG. 1, transmitter modulator 800 can be designed to be compatible with an existing system and to increase the data transmission rate of that system without changing the frame structure and with minimum changes to system data transmission parameters. For example, transmitter modulator 800 can be designed to be compatible with the transmission parameters specified for the CDMA uplink of the IS-95-A system. In the configuration of transmitter modulator 800 that is designed for compatibility with IS-95-A, transmitter modulator 800 may be used with one subchannel of each set of four subchannels enabled and operating at half rate (4.8 kbps data transmission rate), with each enabled subchannel providing data to one of the quadrature channels to transmit at the combined rate of 9.6 kbps. The data transmission rate can then be increased by increasing the data rate of the enabled subchannels and, also, by enabling additional subchannels in each set of four. Data transmission rates of 19.2 kbps, 38.4 kbps, and 76.8 kbps are thus possible using the illustrated embodiment.

Figure 9A:
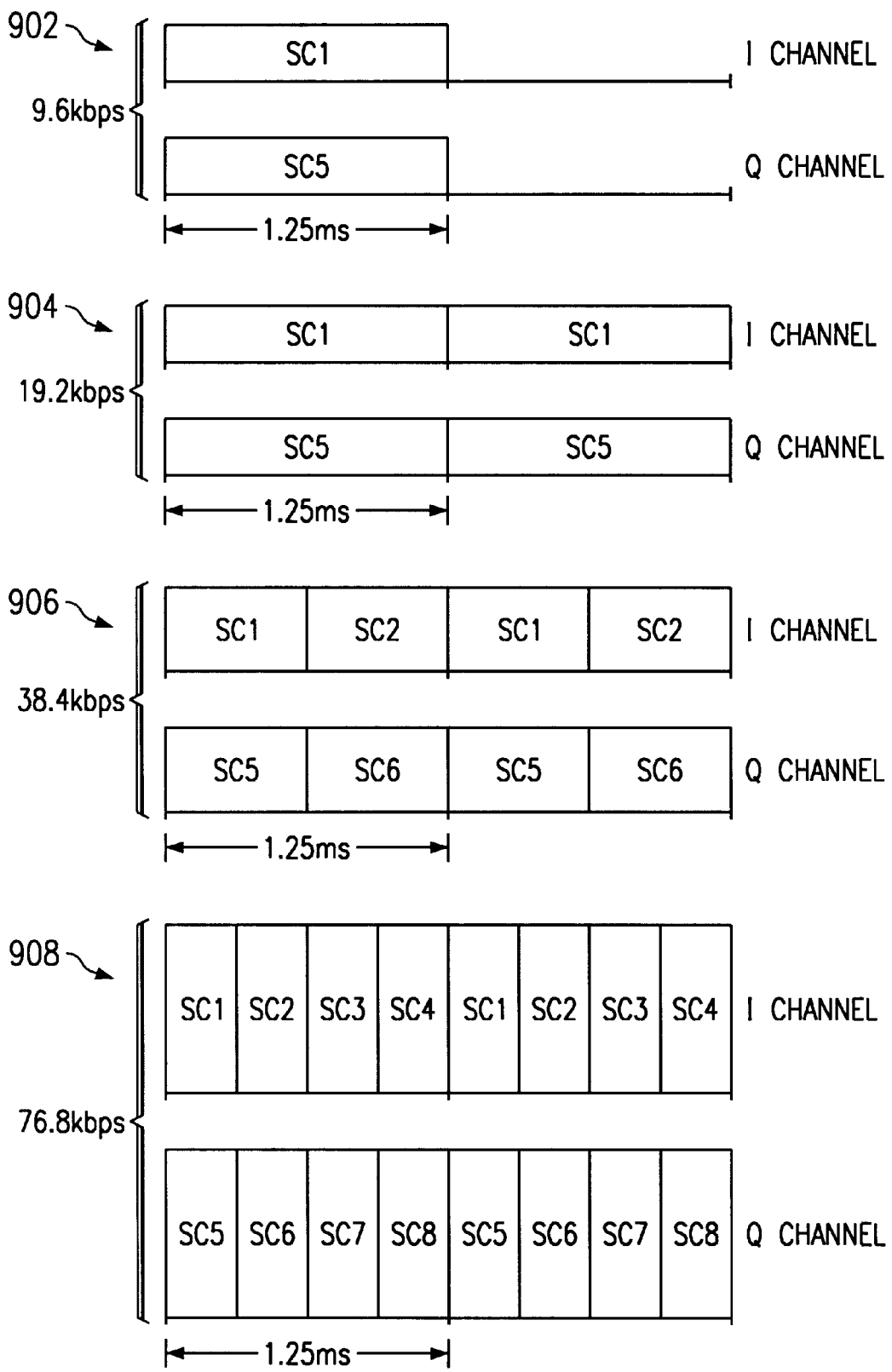
FIGS. 9A–9B are timing diagrams of transmitter modulator operation according to the embodiment of the invention shown in FIG. 8.
Figure 9B:
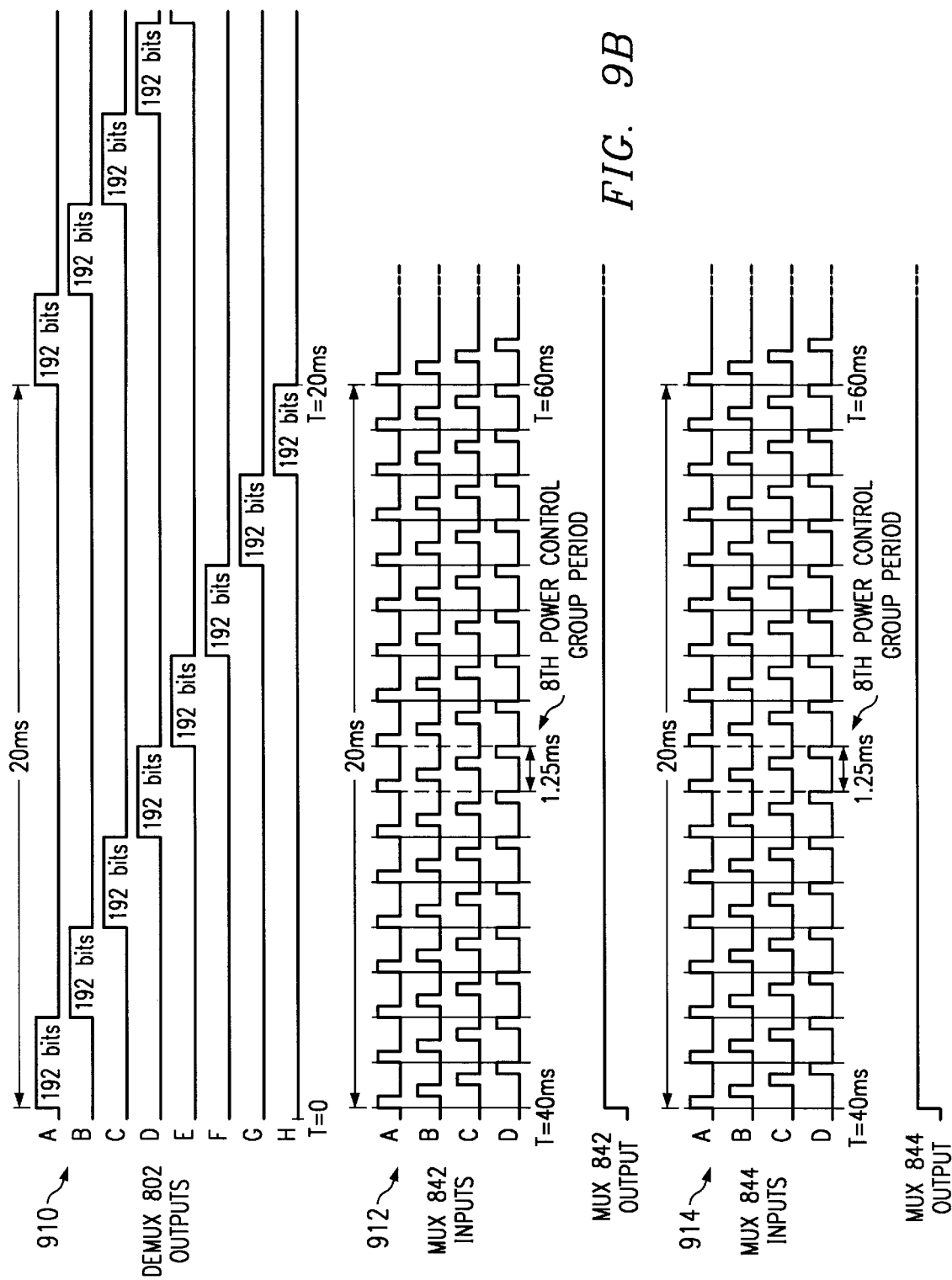

Referring now to FIGS. 9A and 9B, therein are timing diagrams of transmitter modulator operation according to the embodiment of the invention shown in FIG. 8. FIG. 9A illustrates the transmission timing of two 1.25 millisecond periods (power control group periods) within each of four different 20 millisecond transmission frames for the configuration of transmitter modulator 800 that is compatible with IS-95-A. Frame 902 illustrates 9.6 kbps data transmission, frame 904 illustrates 19.2 kbps data transmission, frame 906 illustrates 38.4 kbps data transmission, and frame 908 illustrates 76.8 kbps data transmission. FIG. 9B illustrates internal signal timing within transmitter modulator 800 within a series of 20 ms frames for 76.8 kbps data transmission. Diagram 910 illustrates timing of the output signals of DEMUX 802, diagram 912 illustrates timing of the inputs and output of MUX 842, and diagram 914 illustrates timing of the inputs and output of MUX 844.

When transmitter modulator 800 modulates a 9.6 kbps data rate 20 millisecond frame, one subchannel of each set of four subchannels is enabled. In this case, subchannel 1, formed by CC/INT 804, Walsh mod 820, and data burst randomizer 836, and subchannel 5, formed by CC/INT 812, Walsh mod 828, and data burst randomizer 840 may be enabled. Diagram 902 shows 9.6 kbps data transmission. Data received at input 860 at the rate of 9.6 kbps is directed by DEMUX 802 to each of subchannels 1 and 5 at the rate of 4.8 kbps. Each subchannel then convolutionally encodes, interleaves, and modulates the data onto Walsh symbols over a 20 millisecond period. The data is then input from subchannel 1 to long code spreader 850 and from subchannel 2 to long code spreader 848 at the rate of 307.2 kcps. Each long code spreader spreads each Walsh chip at a rate of 1.2288 mcps. Data from long code spreader 850 is then spread in I PN spreader 852 by an I PN sequence and the data from long code spreader 854 is spread in Q PN spreader by a Q PN sequence. The data is then sent to the RF circuitry where the I data stream is transmitted on the I channel and the Q data stream is transmitted on the Q channel. Diagram 902 of FIG. 9A illustrates two 1.25 millisecond power control group periods of a possible data transmission frame. Data from subchannel 1 (SC1) fills the first 1.25 millisecond period of the frame on the I channel and data from subchannel 5 (SC5) fills the first 1.25 millisecond period of the frame on the Q channel, while the second power control group period is left empty. The location of the filled power control group periods is arbitrary. Since each of the I and Q channels is carrying data at half rate (4.8 kbps), data burst randomizers 836 and 840 may be used to randomize the locations of the eight 1.25 millisecond power control group periods that are used in each 20 millisecond frame.

When data is to be transmitted at the 76.8 kbps rate, all eight subchannels of modulator 800 are used. At the 76.8 kbps data transmission rate each 1.25 millisecond power control period of each 20 millisecond frame transmittal on the I channel includes data from each of the first subchannel (SC1), the second subchannel (SC2), the third subchannel (SC3), and the fourth subchannel (SC4), and each power control group period of each 20 millisecond frame transmittal on the Q channel includes data from each of the fifth subchannel (SC5), the sixth subchannel (SC6), the seventh subchannel (SC7), and the eighth subchannel (SC8). Diagram 908 of FIG. 9A illustrates two 1.25 millisecond power control group periods.

In the case of 76.8 kbps data transmission, transmission rate controller 838 receives, prior to transmitter modulator 800 receiving the data to be modulated at input 860, data rate information indicating that the 76.8 kbps modulation rate is to be used for the next frame or a number of next frames. Transmission rate controller 838 then generates the appropriate signals to DEMUX 802, MUX 842, and MUX 844, CC/INT 804–818 and Walsh modulators 820–834. DEMUX 802 then directs the received 76.8 kbps data to the eight CC/INTs 804–818, so that data is input to each subchannel at the rate of 9.6 kbps. Diagram 910 of FIG. 9B illustrates the signal timing at the outputs of DEMUX 802. At time T=0, each group of 192 bits, of the received 1536 bits in a 20 millisecond period, is directed to outputs A,B,C,D,E,F,G and H, for input to subchannel 1,2,3,4,5,6,7 and 8, respectively. Each of the eight subchannels then operates on the data at a rate of 9.6 kbps in a manner equivalent to that which was described for each channel for transmitter modulator 100 of FIG. 1A for 38.4 kbps data transmission. The data is then output from the subchannels beginning at T=40 millisecond. Diagram 912 of FIG. 9B illustrates the data as received on inputs A,B,C, and D of MUX 842 from subchannel 1,2,3, and 4, respectively, and diagram 914 illustrates the data as received on each input A,B,C, and D of MUX 844 from subchannel 5,6,7, and 8, respectively.

The data received from each of the subchannels fills one 0.325 millisecond period of each 1.25 millisecond power control group period in a 20 millisecond frame, beginning at time T=40 millisecond. The data is received on each input at the rate of 4800 modulation symbols per second. As shown in diagram 912 MUX 842 then multiplexes the data to long code spreader 850 at a rate four times that of the 4800 modulation symbol per second rate received from each single subchannel or, equivalently, at a rate of 1228.8 kcps. MUX 844 performs the identical operation for long code spreader 848. MUXs 844 and 842 may perform the multiplexing at the symbol or chip level. Each long code spreader spreads each Walsh chip at a rate of 1.2288 mcps. Data from long code spreader 850 is then spread in I PN spreader 852 by an I PN sequence and the data from long code spreader 854 is then spread in Q PN spreader by a Q PN sequence. The data is then sent to RF circuitry, similar to that in FIG. 1A, where the I data stream is transmitted on the I channel and the Q data stream is transmitted on the Q channel. Data from subchannel 1(SC1), subchannel 2(SC2), subchannel 3 (SC3), and subchannel 4(SC4), fills the first, second, third, and fourth, respectively, 0.325 millisecond quarters of each 1.25 millisecond power control group period within a 20 millisecond frame on the I channel. Data from subchannel 5(SC5), subchannel 6(SC6), subchannel 7 (SC7), and subchannel 8(SC), fills the first, second, third, and fourth, respectively, 0.325 millisecond long periods of each 1.25 millisecond power control group period within a 20 millisecond frame on the Q channel. Because of the reduction in the spreading of the Walsh chips as compared to the 9.6 kbps data transmission, the transmission power is increased over 19.2 kbps data transmission by a factor of four to 4 PT in order to keep the transmitted power per bit constant.

For the cases of 19.2 kbps and 38.4 kbps data transmission the transmitter modulator 800 functions in a similar manner. Each 192 bit group of the total bits received in a 20 millisecond period at input 860 are directed into subchannels 1 and 5 for 19.2 kbps rate data, and into subchannels 1,2,5, and 6 for 38.4 kbps rate data. The data is then convolutionally encoded, interleaved over a 20 millisecond period, and modulated onto Walsh symbols in each channel. The outputs from each subchannel are then multiplexed to the I channel by MUX 842 or to the Q channel by MUX 844, spread and sent to the RF portion of the transmitter. Diagram 904 of FIG. 9A illustrates two 1.25 millisecond power control group periods of a data transmission frame for 19.2 kbps data transmission. Data from subchannel 1(SC1) fills the 1.25 millisecond power control group periods of the frame on the I channel. Data from subchannel 5(SC5) fills the 1.25 millisecond power control group periods of the frame on the Q channel. Diagram 906 of FIG. 9A illustrates two 1.25 millisecond power control group periods of a data transmission frame for 38.4 kbps data transmission. Data from subchannel 1(SC1) and subchannel 2(SC2) fill the first and second, respectively, 625 millisecond periods of each 1.25 millisecond power control group periods within a 20 millisecond frame on the I channel. Data from subchannel 5(SC5) and subchannel 6(SC6) fill the first and second, respectively, 0.625 millisecond periods of each 1.25 millisecond power control group periods within a 20 millisecond frame on the Q channel. The power used to transmit the 38.4 kbps frame is increased by a factor of two over the value PT used to transmit 9.6 kbps data frames in order to keep the transmitted energy per bit constant. It is also possible to combine the transmitter modulator embodiments shown in FIGS. 3 and 7A to increase the data rate by a factor of two above the maximum data rate of the embodiment of FIG. 3.

Figure 10:
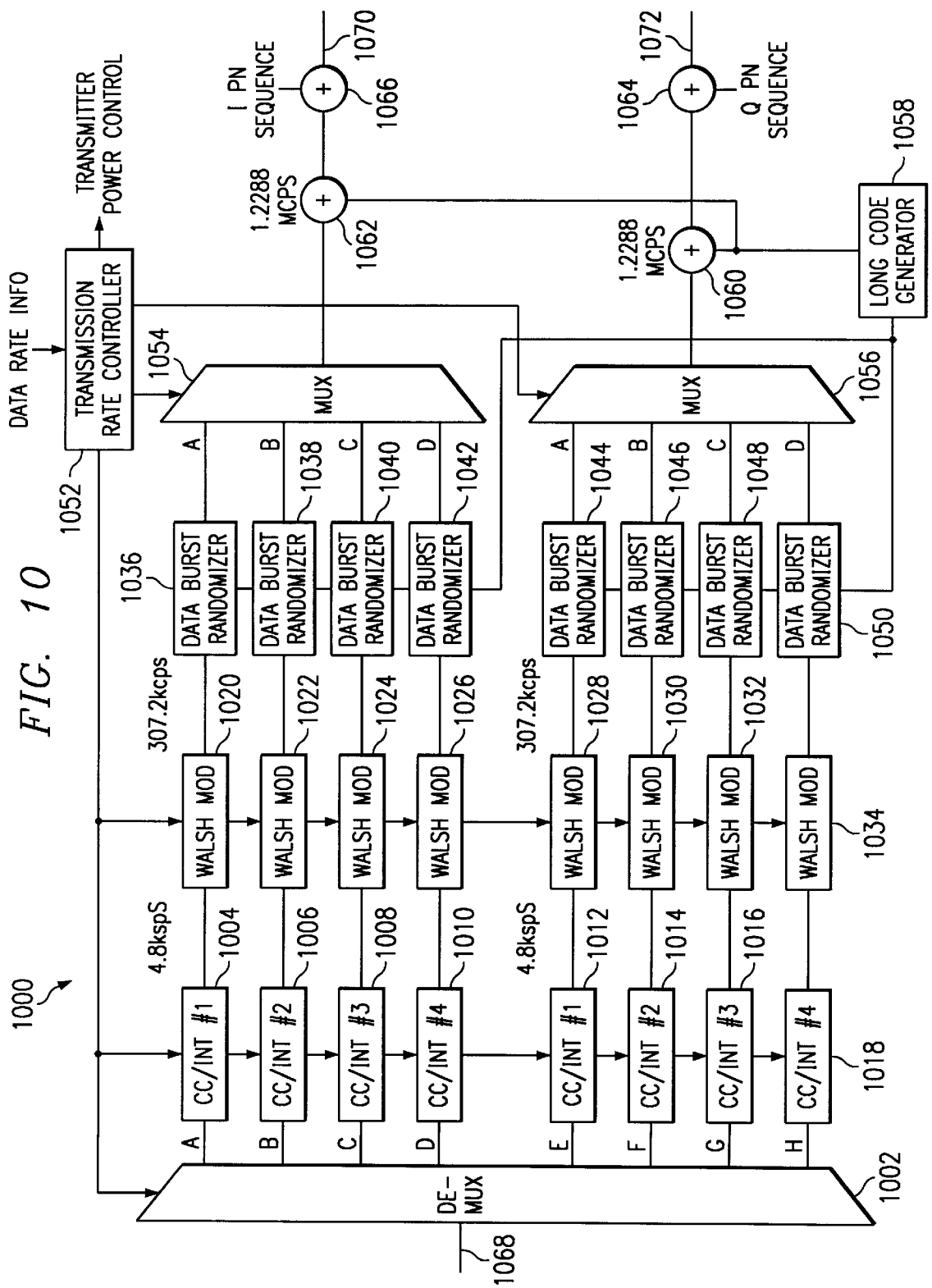
FIG. 10 is a schematic block diagram showing portions of a transmitter modulator utilizing combined multiplexed subchannel and multiplexed I/Q channel data modulation according to an embodiment that combines the transmitter modulators of FIGS. 3 and 7A; and, FIGS. 11A–11B are timing diagrams of transmitter modulator operation according to the embodiment of the invention shown in FIG. 10.

Referring now to FIG. 10, therein is a schematic block diagram showing portions of a transmitter modulator 1000 utilizing combined multiplexed subchannel and multiplexed I/Q channel data modulation, according to an embodiment that combines the principles of the transmitter modulators of FIGS. 3 and 7A. Transmitter modulator 1000 includes DEMUX 1002, eight CC/INTs 1004–1018, eight Walsh modulators 1020–1034, data burst randomizers 1036–1050, MUXs 1054 and 1056, long code generator 1058, long code spreaders 1060 and 1062, I PN spreader 1066, and Q PN spreader 1064. Transmitter modulator 1000 receives data on input 1068 and generates data to the RF portion of a transmitter, such as transmitter circuitry 138 of FIG. 1A, at outputs 1070 and 1072. In the embodiment shown in FIG. 10, transmitter modulator 1000 utilizes two sets of subchannels for a maximum of eight possible parallel subchannels. A set of a maximum of four subchannels (first through fourth subchannels) are available for processing and carrying data between DEMUX 1002 and MUX 1054, and a set of maximum of four subchannels (fifth through eighth subchannels) is available for carrying data between DENUX 1002 and MUX 1056. Each triplet of one of the CC/INTs 1004–1018, one of the Walsh mods 1020–1034 and one of the data burst randomizers 1036–1050 that forms a data path between DEMUX 1002 and MUX 1054 or DEMUX 1002 and MUX 1056 forms a subchannel. For example, CC/INT 1004, Walsh mod 1020 and data burst randomizer 1036 form subchannel 1 for carrying data between DEMUX 1002 and MUX 1054. The number of subchannels in use from each set at any time depends on the data transmission rate requirements. The data from each set of four subchannels is independently modulated onto one of two quadrature channels for simultaneous transmission. Although a maximum of eight parallel subchannels is shown, more or less than four subchannels may be provided in alternative embodiments of the invention. Similarly to the transmitter modulator 300 of FIG. 1, transmitter modulator 1000 can be designed to be compatible with an existing system, to increase the data transmission rate of that system without changing the frame structure and with minimum changes to system data transmission parameter. For example, transmitter modulator 1000 can be designed to be compatible with the transmission parameters specified for the CDMA uplink of the IS-95-A system. In the configuration of the transmitter modulator 1000 that is designed for compatibility with IS-95-A, transmitter modulator 1000 may be used with one subchannel of each set of four subchannels enabled and operating at half rate (4.8 kbps data transmission rate), with each enabled subchannel providing data to one of the quadrature channels to transmit at the combined rate of 9.6 kbps. The data transmission rate can then be increased by increasing the data rate of the enabled subchannels and, also, by enabling additional subchannels in each set of four. Data transmission rates of 9.6 kbps, 19.2 kbps, 38.4 kbps, and 76.8 kbps are possible. The embodiment of FIG. 10 may also be used to support the transmission of data by enabling additional subchannels operating at incremental rates less than 9.6 kbps. The minimum rate for the embodiment of FIG. 10 would be 2.4 kbps, with subchannels one and five each processing data at 1.2 kbps. For example, data may be transmitted at a rate of 28.8 kbps by using DEMUX 1002 to multiplex received 28.8 kbps data into the first channel at 9.6 kbps, into the second channel at 4.8 kbps, into the third channel at 9.6 kbps, and into the six channel at 4.8 kbps, and then transmitting while using the fifth and sixth subchannels at half rate. In this case the second 0.325 millisecond period of each 1.25 millisecond power control group for SC2 and SC6 will be filled in only eight of the sixteen power control group periods of each 20 millisecond frame.

Figure 11A:
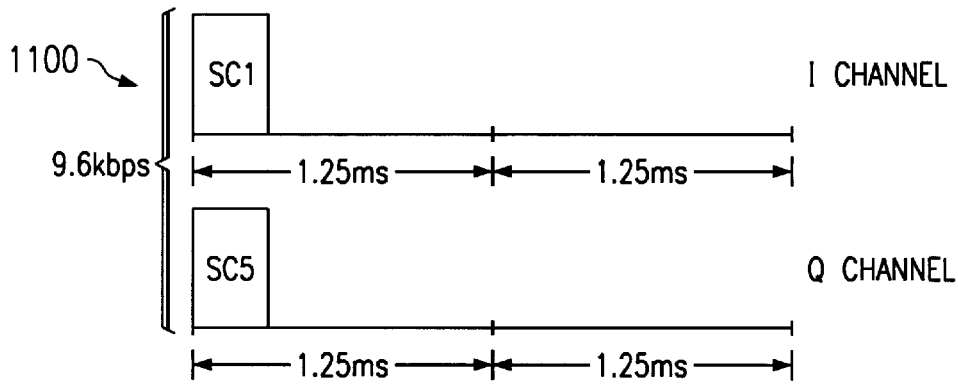
Figure 11A:
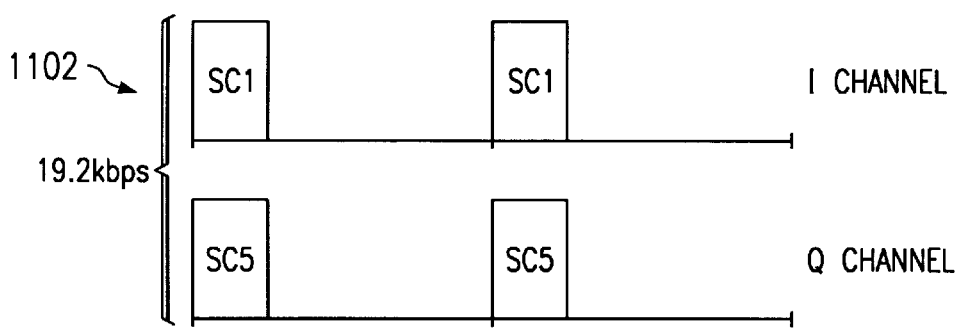
Figure 11A:
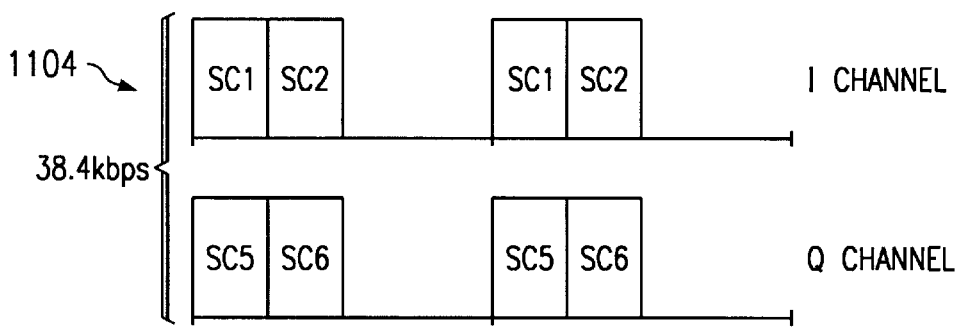
Figure 11A:
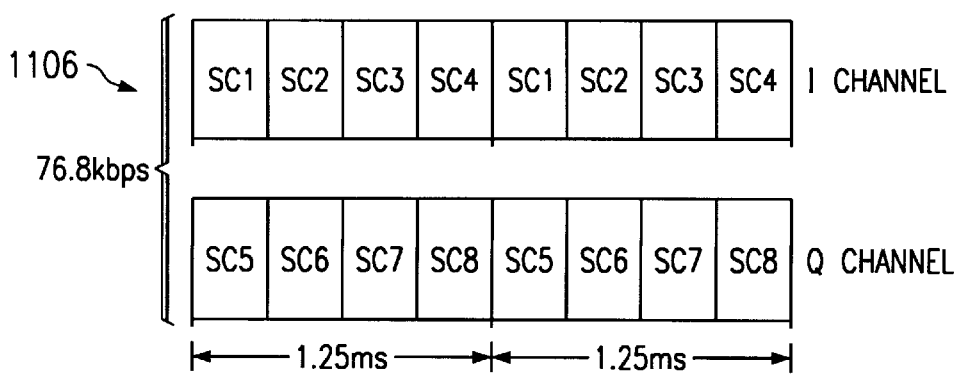
Figure 11B:
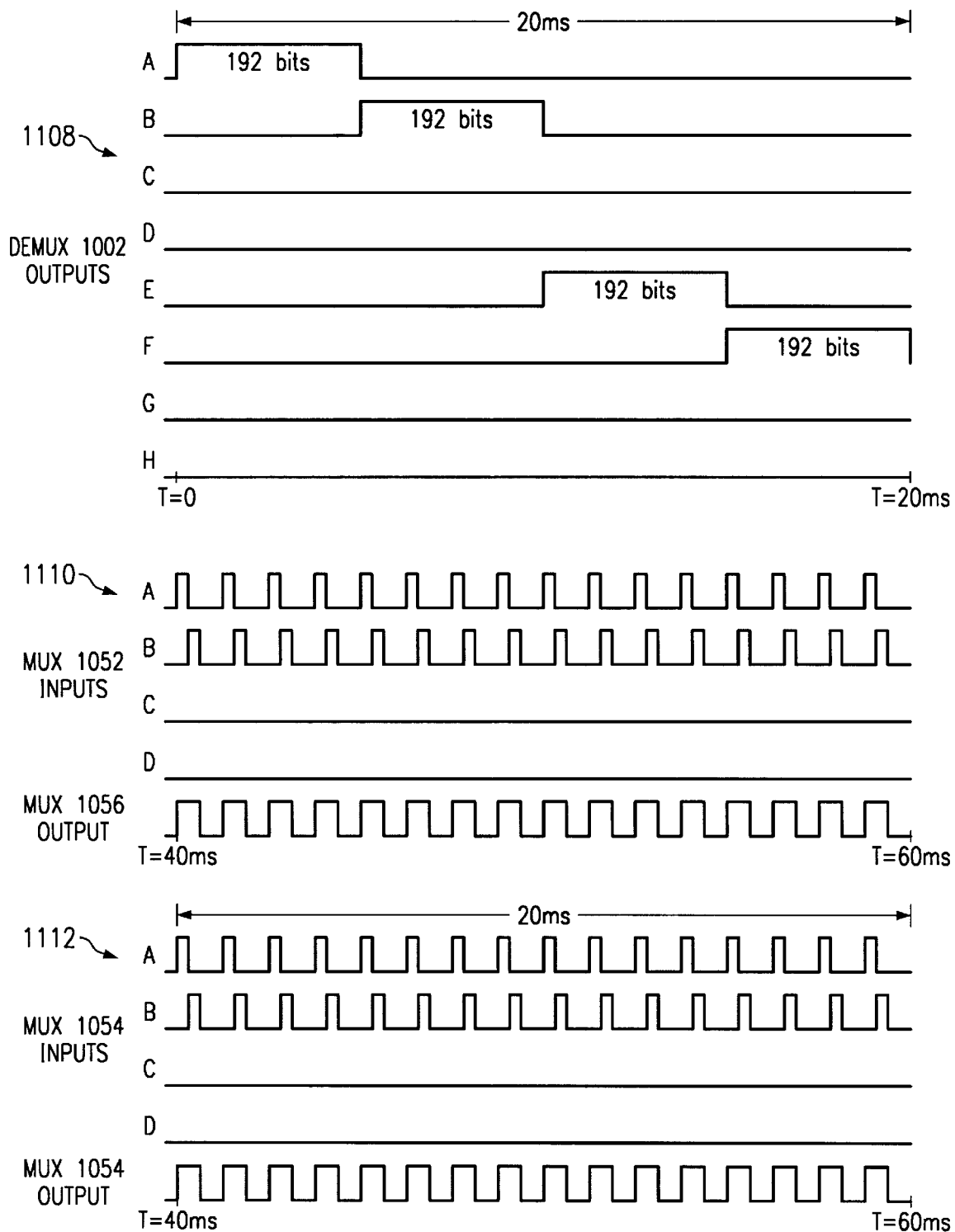

Referring now to FIGS. 11A and 11B, therein are timing diagrams of transmitter modulator operation according to the embodiment of the invention shown in FIG. 10. FIG. 11A illustrates the transmission timing of two 1.25 millisecond periods (power control group periods) within each of four different 20 millisecond transmission frames for the configuration of transmitter modulator 1100 that is compatible with IS-95-A. Frame 1100 illustrates 9.6 kbps data transmission, frame 1102 illustrates 19.2 kbps data transmission, frame 1104 illustrates 38.4 kbps data transmission, and frame 1106 illustrates 76.8 kbps data transmission. FIG. 11B illustrates internal signal timing within transmitter modulator 1000 within a series of 20 millisecond frames for 38.4 kbps data transmission. Diagram 1108 illustrates timing of the output signals of DEMUX 1002, diagram 1110 illustrates timing of the inputs and output of MUX 1056, and diagram 1112 illustrates timing of the inputs and output of MUX 1054.

When transmitter modulator 1000 modulates a 9.6 kbps data rate 20 millisecond frame, one subchannel of each set of four subchannels is enabled. In this case, subchannel 1, formed by CC/INT 1004, Walsh mod 1020, and data burst randomizer 1036, and subchannel 5, formed by CC/INT 1012, Walsh mod 1028, and data burst randomizer 1044 may be enabled. Diagram 1100 shows the 9.6 kbps data transmission case. Data received at input 1068 at the rate of 9.6 kbps is directed by DEMUX 1002 to each of subchannels 1 and 5 at the rate of 4.8 kbps. Each subchannel then convolutionally encodes, interleaves, and modulates the data onto Walsh symbols over a 20 millisecond period. The data is then input from subchannel 1 to long code spreader 1062 and from subchannel 2 to long code spreader 1060 at the rate of 307.2 kcps. Each long code spreader spreads each Walsh chip AT a rate of 1.2288 mcps. data from long code spreader 1062 is then spread in I PN spreader 1066 by an I PN sequence and the data from long code spreader 1060 is then spread in Q PN spreader 1064 by a Q PN sequence. The data is then sent to RF circuitry, similar to RF circuitry 138 of FIG. 1A, where the I data stream is transmitted on the I channel and the Q data stream is transmitted on the Q channel. Diagram 1100 of FIG. 11A illustrates two 1.25 millisecond power control group periods of a possible data transmission frame. Data from subchannel 1 (SC1) fills the first 0.325 millisecond of the first 1.25 millisecond period of the frame on the I channel and data from subchannel 5 (SC5) fills the first 0.325 millisecond of the first 1.25 millisecond period of the frame on the Q channel, while the second power control group period is left empty. The location of the filled power control group periods is arbitrary. Since each of the I and Q channels is carrying data at half rate (4.8 kbps), data burst randomizers 836 and 840 may be used to randomize the locations of the eight 1.25 millisecond power control group periods that are used in each 20 millisecond frame.

When data is to be transmitted at the 76.8 kbps rate, all eight subchannels of modulator 1000 are used. At the 76.8 kbps data transmission rate each 1.25 millisecond power control period of each 20 millisecond frame transmitted on the I channel includes data from each of the first subchannel (SC1), the second subchannel (SC2), the third transmit subchannel (SC3), and the fourth transmit subchannel (SC4), and each power control group period of each 20 millisecond frame transmitted on the Q channel includes data from each of the fifth subchannel (SC5), the sixth subchannel (SC6), the seventh subchannel (SC7), and the eighth subchannel (SC8). Diagram 908 of FIG. 9A illustrates two 1.25 millisecond power control group periods.

In the case of 38.4 kbps data transmission, transmission rate controller 1052 receives, prior to transmitter modulator 1000 receiving the data to be modulated at input 1068, data rate information indicating that the 38.4 kbps modulation rate is to be used for the next frame or a number of next frames. Transmission rate controller then generates the appropriate signals to DEMUX 1002, MUX 1054, and MUX 1056, CC/INT 1004,1006, 1012 and 1014, Walsh modulators 1020, 1022, 1028 and 1030, and data burst randomizers 1036, 1038, 1044 and 1046. DEMUX 1002 then directs the received 38.4 kbps data to the four CC/INTs 1004,1006, 1012 and 1014, so that data is input to each subchannel at the rate of 9.6 kbps. Diagram 1108 of FIG. 11B illustrates the signal timing at the outputs of DEMUX 1002. At time T=0, each group of 192 bits, of the received 768 bits in a 20 millisecond period, is directed to outputs A,B,E and F, for input to subchannels 1, 2, 5 and 6, respectively. Each of the four subchannels then operates on the data at a rate of 9.6 kbps in a manner equivalent to that which was described for each channel for transmitter modulator 100 of FIG. 1A for 38.4 kbps data transmission. The data is then output from the subchannels beginning at T=40 millisecond. Diagram 1110 of FIG. 11B illustrates the data as received on inputs A and B of MUX 1052, from subchannel 1 and 2, respectively, and diagram 1112 illustrates the data as received on inputs A and B of MUX 1056 from subchannels 5 and 6,respectively.

The data received from each of the subchannels fills one 0.325 millisecond period of each 1.25 millisecond power control group period in a 20 millisecond frame, beginning at time T=40 millisecond. The data is received on each input at the rate of 4800 modulation symbols per second. As shown in diagram 1110, MUX 1054 then multiplexes the data to long code spreader 1062 at a rate four times that of the 4800 modulation symbol per second rate received from each single subchannel or, equivalently, at a rate of 1228.8 kcps. MUX 1056 performs the identical operation for long code spreader 1060. MUXs 1054 and 1056 may perform the multiplexing at the symbol or chip level. Each long code spreader spreads each Walsh chip at a rate of 1.2288 mcps. Then data from long code spreader 1062 is then spread in I PN spreader 1066 by an I PN sequence and the data from long code spreader 1060 is then spread in Q PN spreader by a Q PN sequence. The data is then sent to RF circuitry, similar to RF circuitry 138 in FIG. 1A, where the I data stream is transmitted on the I channel and the Q data stream is transmitted on the Q channel. Data from subchannel 1(SC1) and subchannel 2(SC2) fills the first and second, respectively, 0.325 millisecond quarters of each 1.25 millisecond power control group period within a 20 millisecond frame on the I channel. Data from subchannel 5(SC5) and subchannel 6(SC6) fills the first and second, respectively, 0.325 millisecond long periods of each 1.25 millisecond power control group period within a 20 millisecond frame on the Q channel. Diagram 1104 of FIG. 11A illustrates two 1.25 millisecond power control group periods of a data transmission frame.

For the cases of 19.2 kbps and 76.8 kbps data transmission, transmitter modulator 1000 functions in a similar manner. Each 192 bit group of the total bits received in a 20 millisecond period at input 1068 are multiplexed into subchannels 1 and 5 for 19.2 kbps rate data, and subchannels 1,2,3,4, 5, 6, 7 and 8, for 76.8 kbps rate data. The data is then convolutionally encoded, interleaved over a 20 millisecond period, and modulated onto Walsh symbols in each channel. The outputs from each subchannel are then multiplexed to the I channel by MUX 1054 or to the Q channel by MUX 1056, spread and sent to the RF portion of the transmitter. Diagram 1102 of FIG. 11A illustrates two 1.25 millisecond power control group periods of a data transmission frame for 19.2 kbps data transmission. Data from subchannel 1(SC1) fills the first 0.325 millisecond of each 1.25 millisecond power control group periods of the frame on the I channel. Data from subchannel 5(SC5) fills the first 0.325 millisecond of each 1.25 millisecond power control group periods of the frame on the Q channel. Diagram 1106 of FIG. 11A illustrates two 1.25 millisecond power control group periods of a data transmission frame for 76.8 kbps data transmission. Data from subchannel 1(SC1), subchannel 2(SC2), subchannel 3(SC3) and subchannel 4(SC4) fill the first, second, third and fourth, respectively, 0.325 millisecond periods of each 1.25 millisecond power control group period within the 20 millisecond frame on the I channel. Data from subchannel 5(SC5), subchannel 6(SC6), subchannel 7(SC7) and subchannel 8(SC8) fills the first, second, third and fourth, respectively, 0.325 millisecond periods of each 1.25 millisecond power control group period within the 20 millisecond frame on the Q channel.

Although described in the context of presently preferred embodiments, it should be apparent that a number of modifications to these embodiments may occur to those having skill in the art. By example, the various frame and subframe durations and formats may be other than the values specified above.

Also by example, with the described physical layer and multiplex sub-layer structure, and when supporting half of the peak rate transmission, e.g. 19.2 kbps connection using peak rate of 38.4 kbps transmission, a described embodiment performs a gated transmission, i.e. it transmits at 38.4 kbps for 50% of the time. The gated transmission is defined as the first two sub-channels on full-rate (each one pipe carries 9.6 kbps) and the second two sub-channels on zero rate. From FIG. 4A, diagram 402, it can be seen that within each 1.25 millisecond power control group, subchannel #1 and #2 are on 100% and sub-channel #3 and #4 are off 100%, giving regular pulsed transmission. However, it may be desirable to avoid such a regular pulsed transmission in some applications, such the IS-95 reverse link, since it leads to a higher probability of collided transmissions from multiple terminals.

The regular pulsed transmission can be avoided by using the long code to generate a pseudorandom pattern for the ordering of the four sub-channels during each 1.25 millisecond power control group period. For example, during one 1.25 millisecond period, the four sub-channels are time multiplexed in the order of #1, #2, #3, #4. Then in the next 1.25 millisecond period, the order becomes for example, #3, #4, #1, #2, and so on.

It is also within the scope of this invention to achieve a separation of different data rates by using the long code. To support a dynamic rate connection where data rate changes every 20 millisecond, it is important that the base station be able to identify a mobile transmitted data rate within the first 1.25 milliseconds of the 20 millisecond period, in order to conduct reverse link power control correctly. If different data rates are supported by different Walsh symbol rates, as described above, or if different data rates are supported by using symbol repetition and then scaling the transmission power accordingly (such as in the IS-95 forward link), then there may be a potential problem in that the base station will not be able to identify the data rate correctly at the Walsh demodulator output within 1.25 millisecond. Most likely the decision of the data rate is made after channel decoding, which has a delay of about 20 millisecond due to the deinterleave operation.

To enable a fast data rate determination, it is within the scope of the teaching of this invention to mask each different rate by a different long code so that base station can identify the rate immediately after the Walsh demodulator. That is, depending on the data rate of the given 20 millisecond period, the mobile transmitter uses a different long code to spread the data. The base station has several demodulators in parallel, each operating at a different rate, and despread by the corresponding long code.

Thus, although the method and apparatus of this invention has been illustrated and described with regard to presently preferred embodiments thereof, it will be understood that numerous modifications and substitutions may be made to the embodiments described, and that numerous other embodiments of the invention may be implemented without departing from the spirit and scope of the invention as defined in the following claims.

What is claimed is:

1. In a code division multiple access (CDMA) telecommunications system in which data is transmitted on a channel within frames having a frame duration and a base data rate, a method of transmitting data on the channel, said method comprising the steps of:

determining a first data rate of serial data, said serial data to be input to a transmitter over a first time period having a duration equal to the frame duration;

determining, responsive to determining said first data rate, a value for a number of a plurality of subsets of serial data;

partitioning said serial data to generate said plurality of subsets of serial data;

processing each of said plurality of subsets of serial data substantially simultaneously to generate a plurality of error-protected subsets of serial data;

Walsh modulating said error-protected subsets of serial data substantially simultaneously to generate a plurality of modulated subsets of serial data, wherein Walsh symbols of equal length are used for modulating each error-protected subset of serial data;

multiplexing the plurality of modulated subsets of serial data over a second time period having a duration equal to the frame duration to generate at least one serial data stream, wherein at least one of said at least one serial data streams includes at least two of said plurality of modulated subsets of serial data, and said serial data included in said at least one serial data stream is generated at said first data rate;

spreading each said at least one serial data stream by a single spreading code to generate at least one spread data stream; and transmitting, from the transmitter, said at least one spread data stream on the channel during a second time period, wherein said serial data included in said at least one spread data stream is transmitted at said first data rate.

2. The method of claim 1, wherein each of said plurality of sets of data comprises a plurality of data bits and said step of processing comprises convolutionally encoding and interleaving said plurality of data bits within each of said plurality of subsets of serial data to generate a plurality of error-protected subsets of serial data.

3. The method of claim 1 wherein said step of determining a first data rate comprises:

receiving data rate information at the transmitter, said data rate information including information indicating a data rate of serial data to be transmitted over the first time period.

4. The method of claim 1 further comprising, after said step of determining a value, the step of determining a transmission power level according to said value for a number of said plurality of subsets of serial data, and wherein said step of transmitting comprises transmitting said spread data stream at said transmission power level.

5. The method of claim 1, wherein said telecommunications systems allows a base data transmission rate, and wherein said first data rate varies as a whole multiple of said base data transmission rate.

6. The method of claim 1, wherein said telecommunications system allows a base data transmission rate and at least one fractional data transmission rate, and wherein said first data rate varies as a multiple of said base data rate plus said at least one fractional rate.

7. The method of claim 1, wherein said channel comprises a quadrature channel (Q) and an in-phase channel (I), wherein each of said plurality of subsets of serial data comprises a plurality of data bits and wherein said step of multiplexing the plurality of modulated subsets of serial data comprises multiplexing said plurality of sets of processed data at the Walsh symbol level to generate first and second serial output data streams, wherein said step of spreading comprises spreading each of said first and second serial output data streams to generate first and second spread data streams, and wherein said step of transmitting comprises transmitting said first spread data stream on said quadrature channel, and transmitting said second spread data stream on said in-phase channel.

8. The method of claim 1 wherein said plurality of subsets of serial data comprises a first plurality of subsets of serial data, said plurality of modulated subsets of serial data comprises a first plurality of modulated subsets of serial data, said at least one serial data stream comprises a first at least one serial data stream, and wherein said method comprises:

receiving, at a receiver, said first at least one spread data stream transmitted on the channel;

despreading said first at least one spread data stream to generate a second at least one serial data stream;

demultiplexing said second at least one serial data stream to generate a second plurality of modulated subsets of serial data;

processing each of said second plurality of modulated subsets of serial data substantially simultaneously to generate a second plurality of subsets of serial data, said second plurality of subsets of serial data including said serial data; and multilplexing said second plurality of subsets of serial data to regenerate said serial data, wherein said serial data is regenerated at said first rate.

9. In a code division multiple access (CDMA) telecommunications system in which data is transmitted in frames having a frame duration on a communications channel having a quadrature channel (Q) and an in-phase channel (I) each having at least one data transmission rate, a method of transmitting data on the communications channel, said method comprising the steps of:

receiving serial data at a first data rate over a first time period, said first data rate being twice the at least one data transmission rate, and said first time period having a duration equal to the frame duration;

modulating said serial data onto mutually orthogonal Walsh symbols;

multiplexing said Walsh symbols into first and second symbol streams; and transmitting said first and second symbol streams on said quadrature and in-phase channels, respectively, during a second time period having a duration equal to the frame duration, wherein each of said quadrature and in-phase channels carries a subset of information included in said serial data at said at least one data transmission rate.

10. The method of claim 9, wherein said serial data comprises a plurality of data bits, and wherein said method further comprises, before said step of modulating, the step of convolutionally encoding and interleaving said plurality of data bits to generate encoded data, and, wherein said step of modulating comprises modulating said encoded data onto mutually orthogonal Walsh symbols.

11. Apparatus for transmitting data in a code division multiple access (CDMA) telecommunications system in which data is transmitted on a channel within frames having a frame duration and a base data rate, said apparatus comprising:

an input circuit having a serial input, a control input, and a plurality of outputs, said input circuit for receiving serial data at said serial input during a first time period having a duration equal to said frame duration, and generating a plurality of subsets of serial data, each of said plurality of subsets of serial data being available at one output of said plurality of outputs;

a transmission rate controller having a rate input and at least one control output, said at least one control output of said transmission rate controller coupled to said control input of said input circuit, said transmission rate controller for receiving data rate information at said rate input, said data rate information indicating a data rate of serial data to be received at said input of said input circuit over at least the first time period, said transmission rate controller further for determining, responsive to receiving said data rate information, a value for a number of a plurality of subsets of serial data to be generated in said input circuit based on a ratio of said first data rate to the base data rate, and sending a control signal on said control output to said input circuit, and wherein said input circuit receives said control signal and generates said plurality of subsets of serial data of a number according to said value determined in said transmission rate controller;

a plurality of subchannel processors for processing each of said plurality of subsets of serial data substantially simultaneously, each subchannel processor having a subchannel input and a subchannel output, the input of each of said plurality of subchannel processors coupled to one of said plurality of parallel outputs of said input circuit, each one of said plurality of subchannel processors for receiving one of said plurality of subsets of serial data from said input circuit, processing said one of said plurality of subsets of serial data to generate one of a plurality of error-protected subsets of serial data and Walsh modulating said one of a plurality of error-protected subsets, wherein each of said plurality of modulated subsets of serial data is generated at a subchannel output of one of said plurality of subchannel processors, and said plurality of modulated subsets of serial data includes said serial data;

a multiplexer having a plurality of parallel inputs and at least one serial output, each of said plurality of parallel inputs coupled to said subchannel output of one of said plurality of subchannel processors, said multiplexer for receiving one of said plurality of modulated subsets of serial data at each of said parallel inputs, and generating at least one serial data stream at said at least one serial output during a second time period having a duration equal to the duration of said frame, wherein at least one of said at least one serial data streams includes at least two of said plurality of modulated subsets of serial data; and a spreader having an input and an output, said input of said spreader coupled to said at least one serial output of said multiplexer, said spreader for spreading each at least one serial data stream by a single spreading code to generate at least one spread data stream for transmission on the channel.

12. The method of claim 11, wherein each of said plurality of subsets of serial data comprises a plurality of data bits and wherein each of said plurality of subchannels includes a convolutional encoder/interleaver for convolutionally encoding and interleaving said plurality of data bits within one of said plurality of subsets of serial data to generate said plurality of encoded subsets of serial data.

13. The apparatus of claim 11, wherein said transmission rate controller includes a power control output, and said transmitter includes a power control input coupled to said power control output, and wherein said transmission rate controller further determines a transmission power level according to said value for a number of a plurality of subsets of serial data, generates a control signal to said transmitter at said power control output, and wherein said transmitter receives said power control signal at said power control input and transmits said at least one serial spread data stream at said transmission power level.

14. The apparatus of claim 11, wherein said telecommunications system allows a base data transmission rate and wherein said first data rate varies as a multiple of said base data transmission rate.

15. The apparatus of claim 11, wherein said telecommunications system allows a base data transmission rate and a fractional data transmission rate that is a fraction of said base data transmission rate, and wherein said first data rate varies as a multiple of said base data transmission rate plus said fractional rate.

16. The apparatus of claim 11, wherein said channel comprises a quadrature channel and an in-phase channel, and said at least one serial data stream generated in said multiplexer comprises first and second serial output data streams, wherein said spreader spreads each of said first and second serial output data streams to generate first and second spread data streams, and wherein said transmitter transmits said first spread data stream on said quadrature channel and said second spread data stream on said in-phase channel.

17. The apparatus of claim 11, wherein each of said plurality of subsets of serial data generated in said input circuit comprises a plurality of data bits, said value determined in said transmission rate controller comprises a first value, and a second value defines a maximum number of subchannels for processing said plurality of subsets of serial data, and wherein said transmitter spreads each Walsh symbol in said plurality of modulated subsets of serial data using a spreading factor equal to said second value divided by said first value.

18. Apparatus for receiving data in a code division multiple access (CDMA) telecommunications system in which at least one spread data stream including serial data is transmitted on a channel within frames having a frame duration and a base data rate, said apparatus comprising:

a receiver having at least one serial output, said receiver for receiving said at least one spread data stream transmitted on the channel during a first time period having a duration equal to said frame duration;

a de-spreader having at least one serial output and at least one serial input connected to said at least one serial output of said receiver, said de-spreader for despreading each said at least one serial spread data stream using a single spreading code and generating at least one received data stream;

a demultiplexer having at least one serial input and a plurality of parallel outputs, said at least one serial input connected to said at least one serial output of said despreader, said demultiplexer for demultiplexing said at least one received data stream to generate a plurality of subsets of serial data, wherein at least two of said plurality of subsets of serial data are generated from a single one of said at least one received data stream;

a plurality of subchannel processors for processing each of said plurality of subsets substantially simultaneously, each subchannel processor having a subchannel input and a subchannel output, the input of each of said plurality of subchannels coupled to one of said plurality of parallel outputs of said demultiplexer, each one of said plurality of subchannel processors for receiving one of said plurality of subsets of serial data from said demultiplexer, processing said one of said plurality of subsets of serial data to generate one of a plurality of error-protected subsets of serial data and Walsh modulating said one of a plurality of error-protected subsets, and generating one of a plurality of sets of processed data, wherein said plurality of sets of processed data is generated at said subchannel outputs of said plurality of subchannels and said plurality of sets of processed data includes said serial data; and a multiplexer having a plurality of parallel inputs and at least one serial output, each of said plurality of parallel inputs coupled to said subchannel output of one of said plurality of subchannels, said mutliplexer for receiving said plurality of sets of processed data and generating an output stream including said serial data.

19. Apparatus for transmitting data in a code division multiple access (CDMA) telecommunications system in which data is transmitted in consecutive frames having a frame duration on a communications channel having a quadrature channel (Q) and an in-phase channel (I) each having at least one data transmission rate, said apparatus comprising:

a processor having an input and an output, said processor for receiving serial data on said input at a first data rate over a first time period, said first data rate being twice the at least one data transmission rate, and said first time period having a duration equal to the frame duration, said processor further for modulating said serial data onto mutually orthogonal Walsh symbols to generate processed data at said output;

a multiplexer, having an input coupled to said output of said processor and first and second outputs, said multiplexer for receiving and multiplexing said processed data onto first and second output symbol streams and outputting said first and second output symbol streams at said first and second outputs, respectively; and a transmitter having a quadrature and an in-phase input, said transmitter for receiving said first and second output symbol streams on said quadrature and in-phase inputs, respectively, and transmitting said first and second symbol streams on said quadrature and in-phase channels, respectively, during a second time period having a duration equal to the frame duration, wherein each of said quadrature and in-phase channels carries a subset of information included in said serial data at said at least one data transmission rate.

20. The apparatus of claim 19 wherein said serial data comprises a plurality of data bits, and wherein said processor further convolutionally encodes and interleaves said plurality of data bits to generate encoded data, and modulates said encoded data onto mutually orthogonal Walsh symbols to generate processed data at said output.

21. A method as set forth in claim 1, wherein the step of spreading uses, for each possible data rate, a spreading code that is specific to the data rate.

22. A method as set forth in claim 1, wherein the sets of processed data are multiplexed in an order determined by a pseudorandom pattern obtained from a spreading code used in the step of spreading.

* * * * *